July 4, 1950 S. J. BEGUN 2,513,617
MAGNETIC RECORDING AND REPRODUCING
Filed Aug. 6, 1946 7 Sheets-Sheet 1
FIG 1
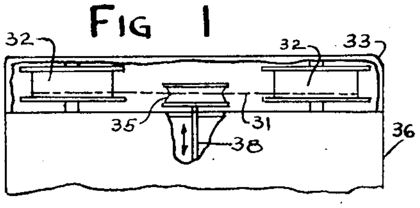
FIG 1-B
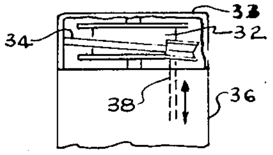
FIG 1-A
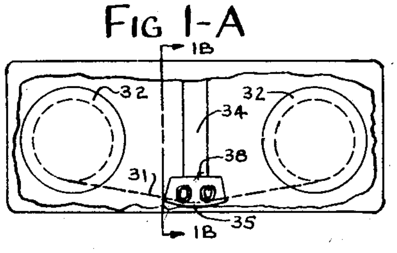
FIG 2
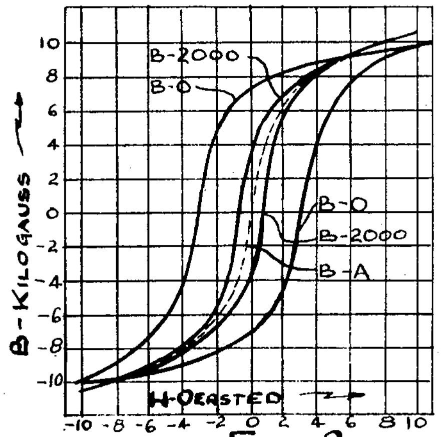
FIG 2-A
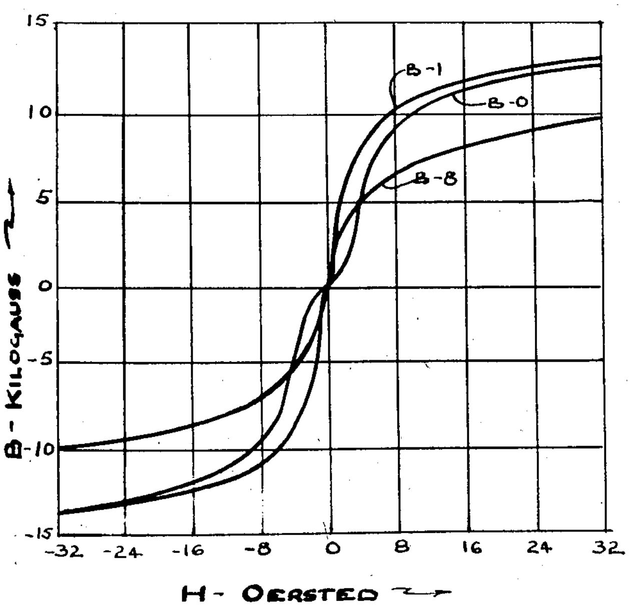
FIG 3
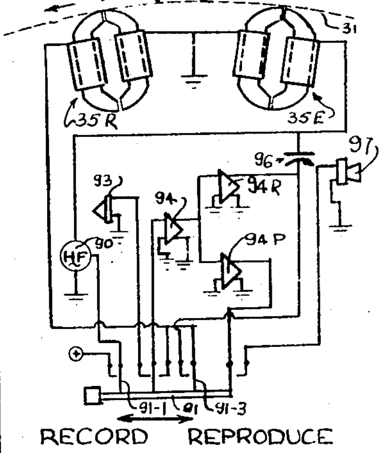
S. J. BEGUN
INVENTOR
BY Pierce & Greene
ATTORNEYS July 4, 1950 S. J. BEGUN 2,513,617
MAGNETIC RECORDING AND REPRODUCING
Filed Aug. 6, 1946 7 Sheets-Sheet 2
Fig. 5
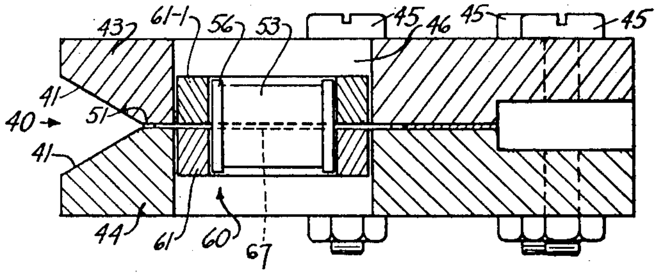
Fig. 5-A
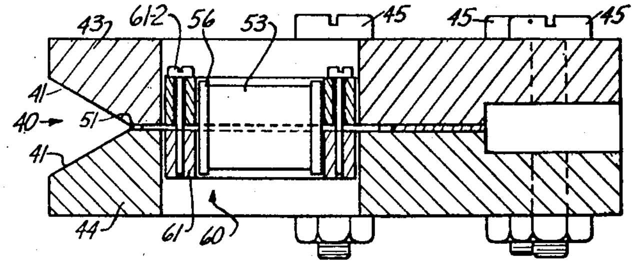
Fig. 6
Fig. 6-A
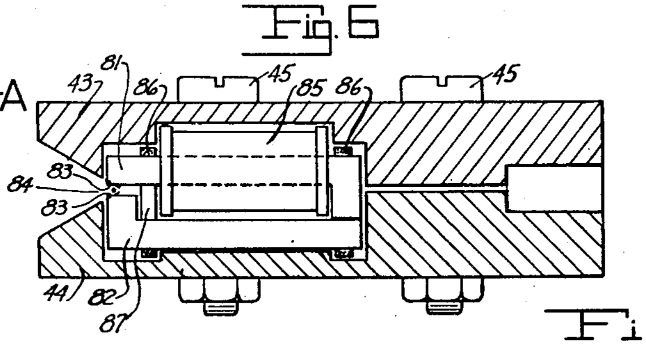
Fig 14
Fig 12
Fig 13
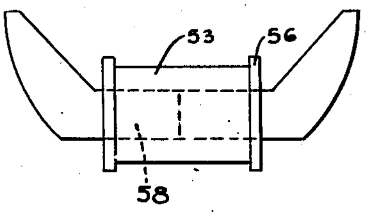
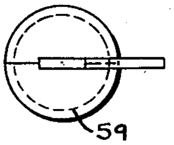
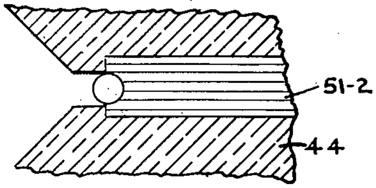
INVENTOR.
S. J. BEGUN
BY Pineles & Greene
Attorneys July 4, 1950 S. J. BEGUN 2,513,617
MAGNETIC RECORDING AND REPRODUCING
Filed Aug. 6, 1946 7 Sheets-Sheet 3
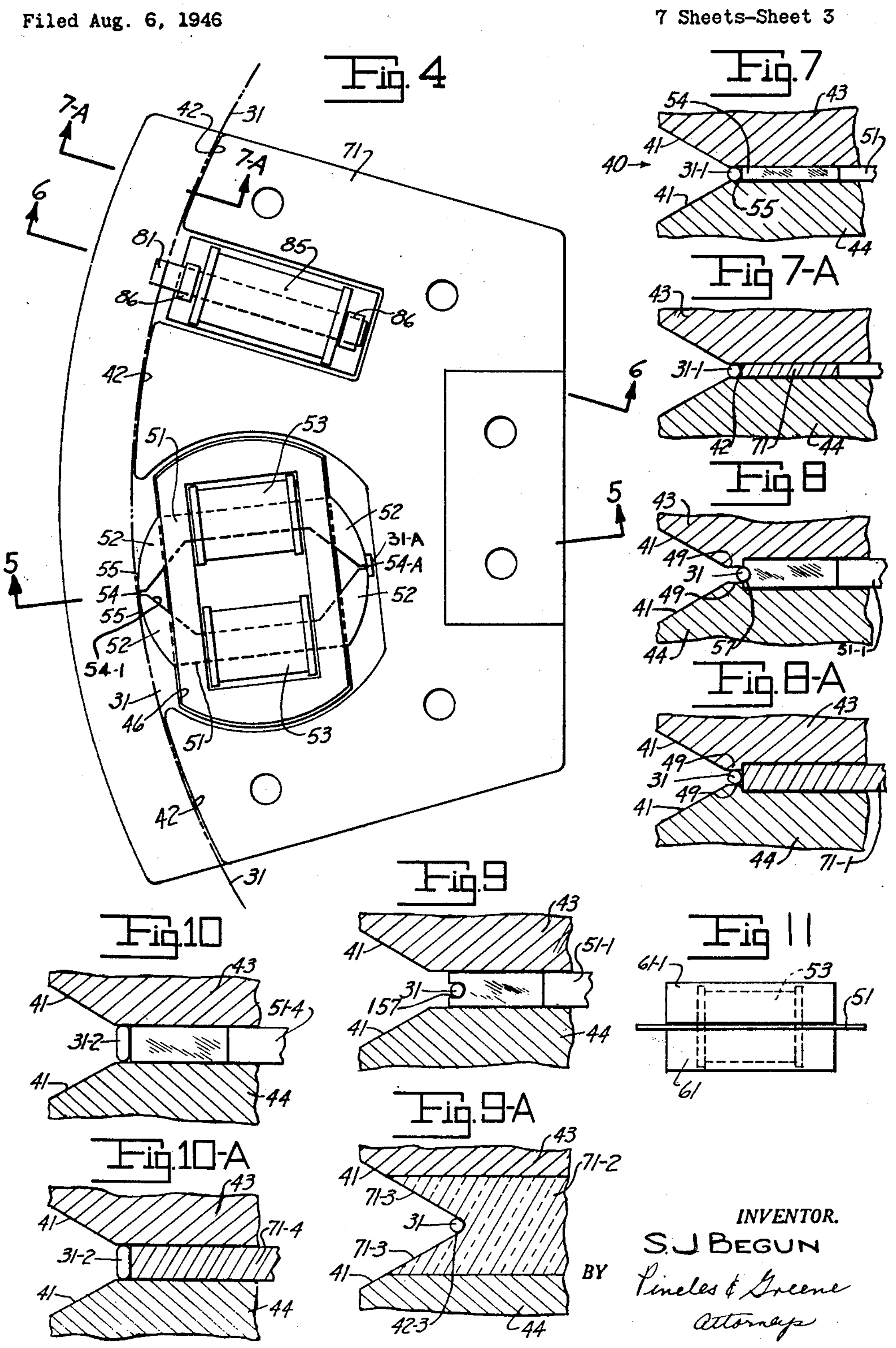
Fig. 4, Fig. 7, Fig. 7-A, Fig. 8, Fig. 8-A, Fig. 9, Fig. 9-A, Fig. 10, Fig. 10-A, Fig. 11
INVENTOR.
S. J. BEGUN
BY Pineles & Greene
Attorneys July 4, 1950 S. J. BEGUN 2,513,617

MAGNETIC RECORDING AND REPRODUCING

Filed Aug. 6, 1946 7 Sheets-Sheet 4

INVENTOR
S J BEGUN
BY Fineles & Greene
ATTORNEYS

July 4, 1950 S. J. BEGUN 2,513,617

MAGNETIC RECORDING AND REPRODUCING

Filed Aug. 6, 1946 7 Sheets-Sheet 5

INVENTOR.

S.J. BEGUN

BY Pineles & Greene

ATTORNEYS

July 4, 1950 S. J. BEGUN 2,513,617

MAGNETIC RECORDING AND REPRODUCING

Filed Aug. 6, 1946 7 Sheets-Sheet 6

INVENTOR

S. J. BEGUN

BY Pineles & Greene

ATTORNEYS

July 4, 1950 S. J. BEGUN 2,513,617

MAGNETIC RECORDING AND REPRODUCING

Filed Aug. 6, 1946 7 Sheets-Sheet 7

INVENTOR
S. J. BEGUN
BY Pineles & Greene
ATTORNEYS

Patented July 4, 1950

2,513,617

UNITED STATES PATENT OFFICE 2,513,617

MAGNETIC RECORDING AND REPRODUCING

Semi Joseph Begun, Cleveland Heights, Ohio, assignor to The Brush Development Company, Cleveland, Ohio, a corporation of Ohio Application August 6, 1946, Serial No. 688,738

13 Claims. (Cl. 179—100.2)

This invention relates to magnetic recording and reproducing and it has among its objects improved magnetic transducer head arrangements which make it possible to magnetically record or reproduce signals by means of a moving magnetic signal-carrier filament, such as a magnetic wire with substantially uniform response and level characteristics, without requiring special laborious, expensive, time-consuming and manual adjustments of each individual transducer head, and in which the magnetic core is stably disposed against non-magnetic metallic supporting structure.

The foregoing and other objects of the invention will be best understood from the following description of exemplifications thereof, reference being had to the accompanying drawings wherein Fig. 1 is a diagrammatic side view of a magnetic wire recording device with parts broken away;

Fig. 1A is a similar top view of the device shown in Fig. 1;

Fig. 1B is a cross-sectional view along the line 1B—1B of the device shown in Fig. 1;

Figs. 2 and 2A are explanatory curve diagrams showing the effect of superposed alternating current on the hysteresis loop and magnetization curves, respectively, of magnetic material;

Fig. 3 illustrates in diagrammatic form one method of operating a recording apparatus of the invention using A. C. bias;

Fig. 4 is a top view of a magnetic transducer head with the top wall removed;

Fig. 5 is a cross-sectional view along line 5—5 of the transducer head of Fig. 4;

Fig. 5A is a view similar to Fig. 5 of a modified constructional form;

Fig. 6 is a cross-sectional view along lines 6—6 of the transducer head of Fig. 4;

Fig. 6A is a fragmentary front view of the pole face region of the magnetic core of Fig. 6;

Fig. 7 is a cross-sectional view similar to Fig. 5 of the pole face region of the double pole-piece unit of the transducer head of Figs. 4 and 5;

Fig. 7A is a cross-sectional view of the guide channel element of the transducer head along line 7A—7A of Fig. 4;

Figs. 8 and 8A are views similar to Figs. 7 and 7A of a modified construction;

Figs. 9 and 9A are views similar to Figs. 7 and 7A of another modified construction;

Figs. 10 and 10A are views similar to Figs. 7 and 7A of a further modified construction;

Fig. 11 is a side elevation of the double pole-piece sub-assembly of Fig. 5;

Figs. 12 and 13 are top and side views, respectively, of pole piece units;

Fig. 14 is a view similar to Figs. 7 and 8 of a modified form of construction;

Figures 15, 16, 17, 18, 21, 22, 23:
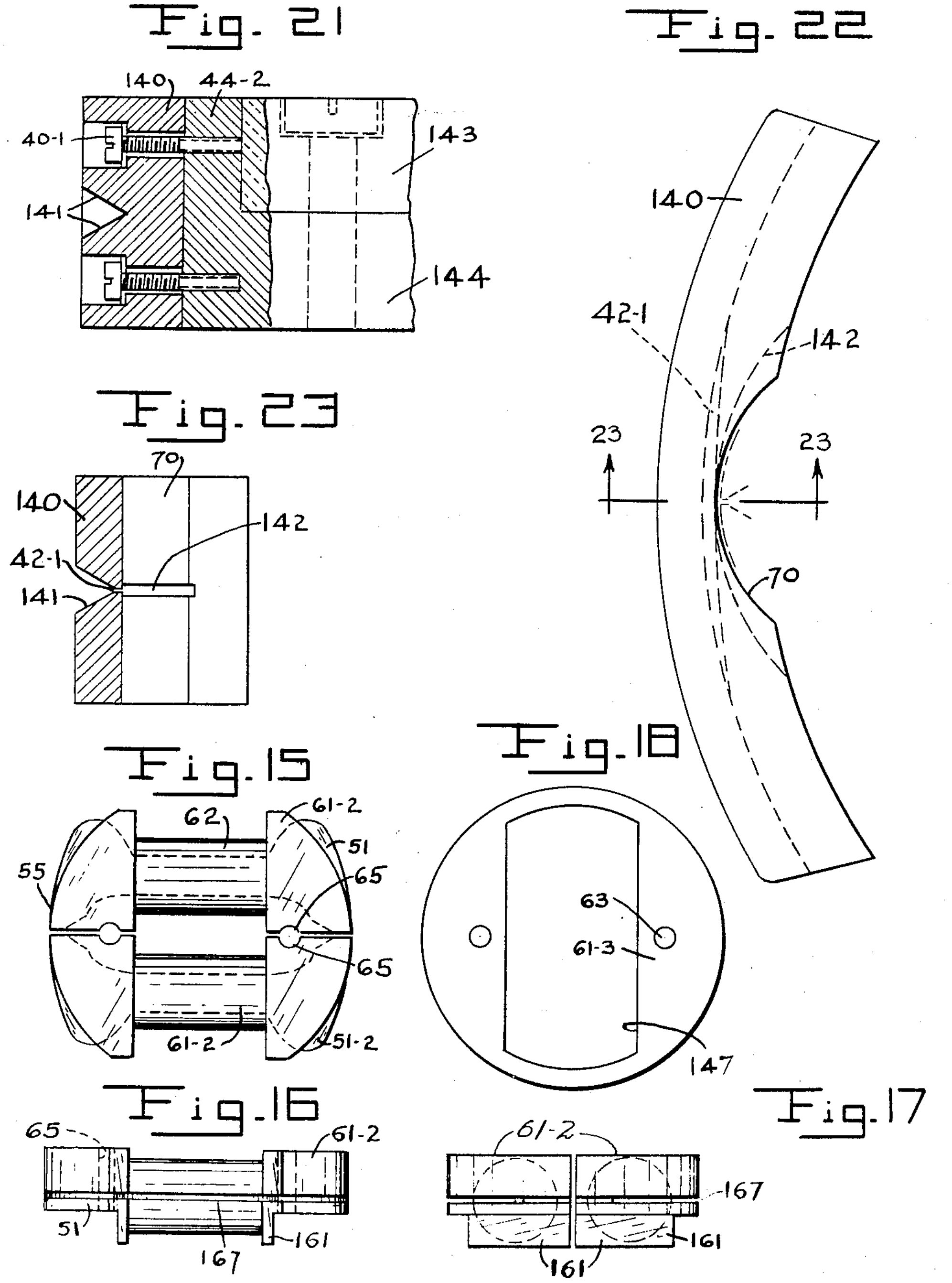
Figure 19:
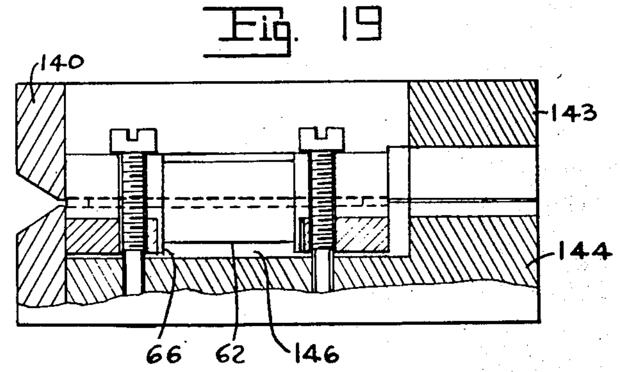
Figure 20:
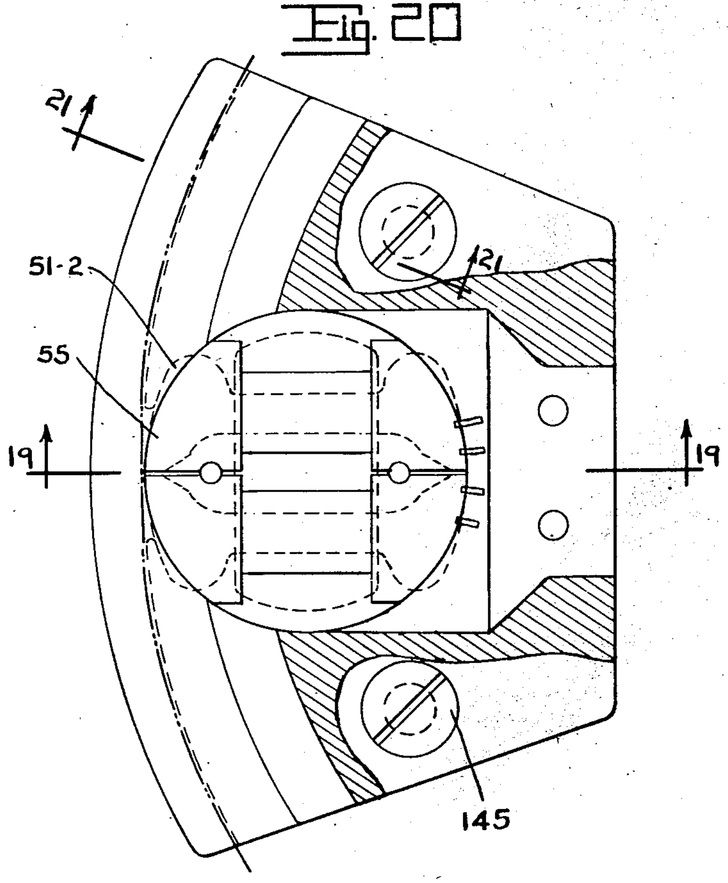
Figures 24, 25, 26, 27, 28, 29:
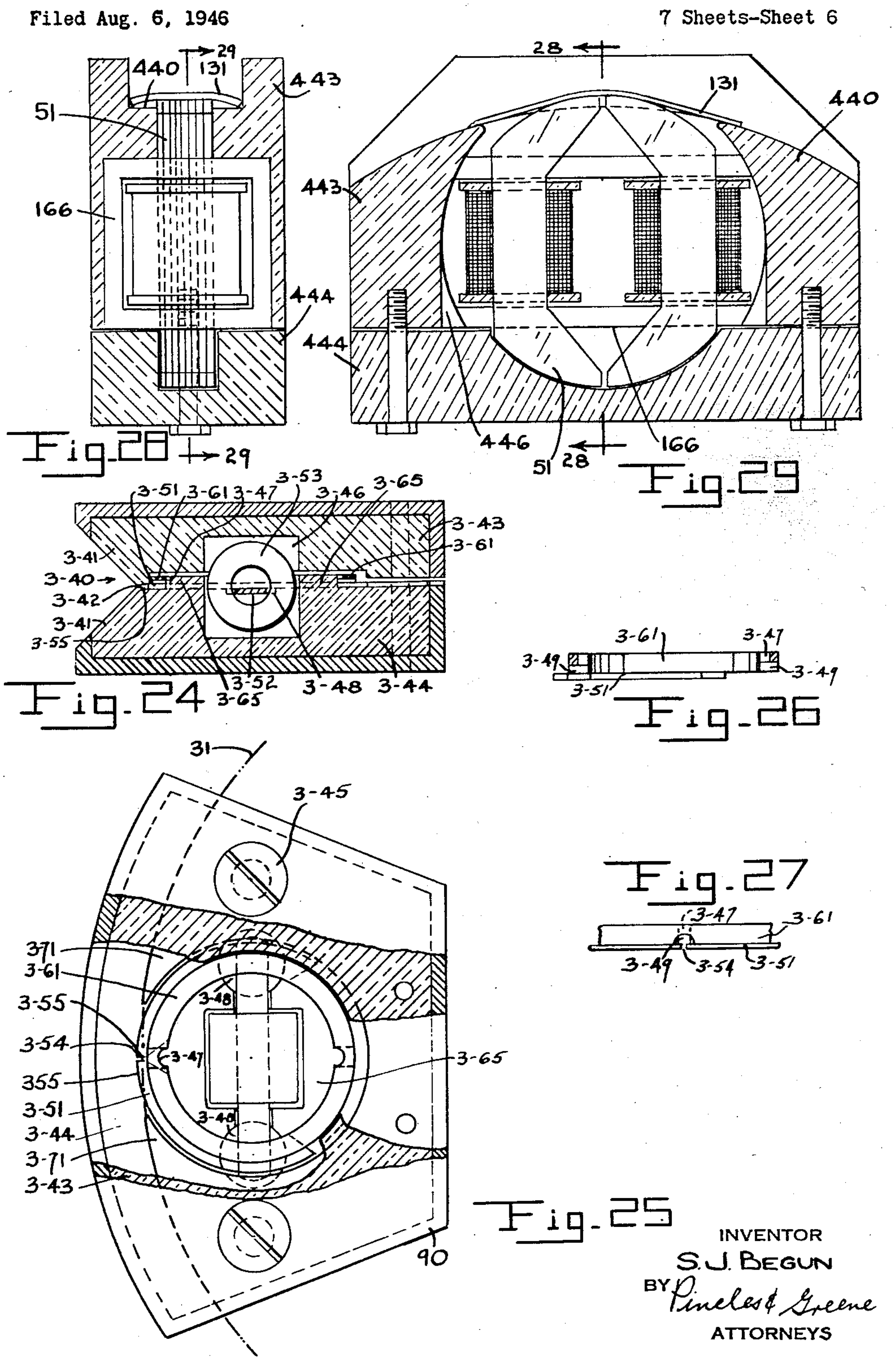
Figure 31:
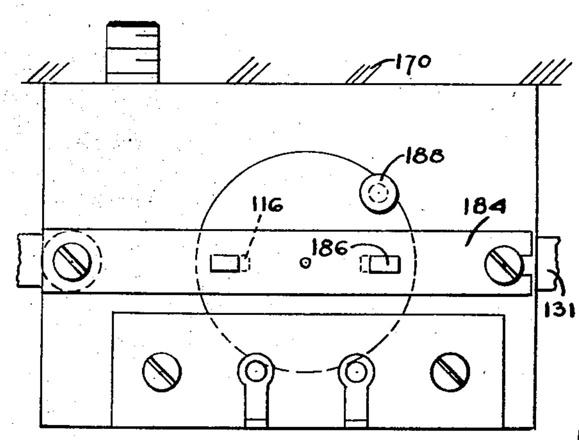
Figure 33:
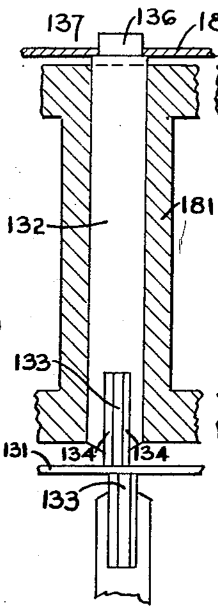
Figure 34:
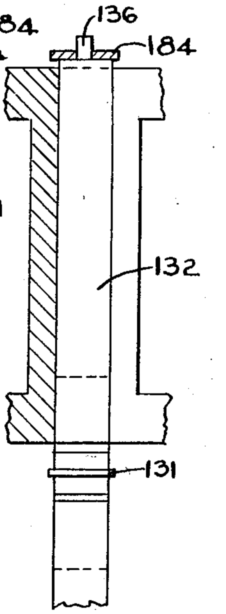
Figure 30:
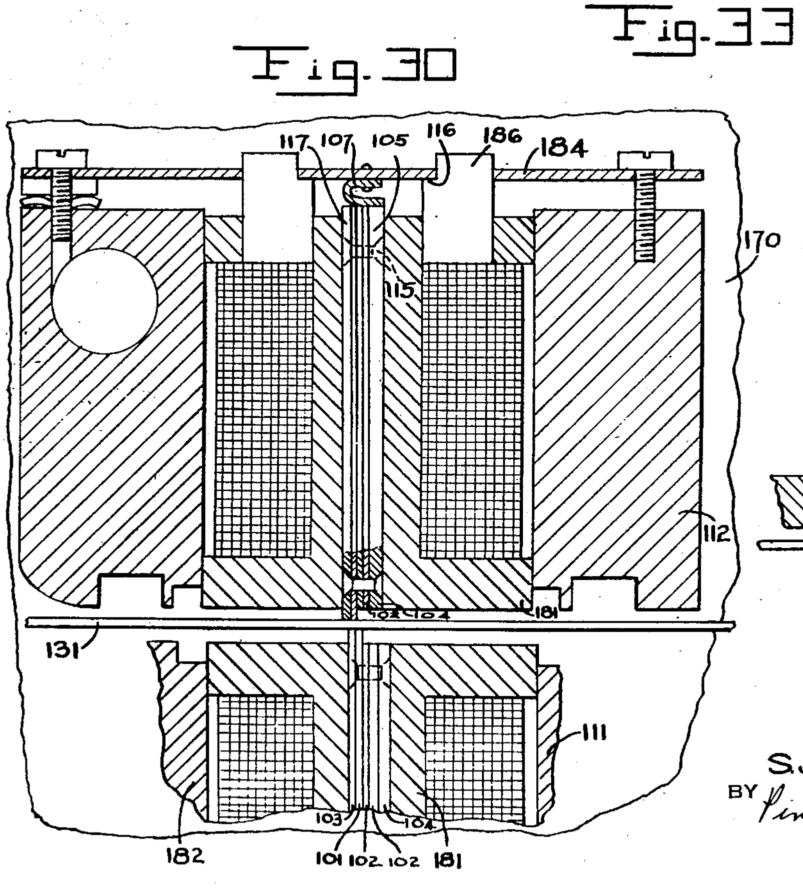
Figure 32:
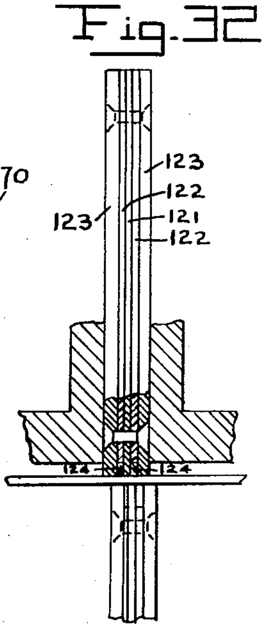

Figs. 15, 16, 17 and 18 are views of another exemplification of a double pole-piece sub-assembly of the invention, Fig. 15 being a top view of the magnetic core sub-assembly without its mounting ring, Fig. 16 a side view of this structure looking upwardly from the lower end of Fig. 15, Fig. 17 an end view of the construction of Fig. 15 without the pole pieces looking at it from the right end of Fig. 15, and Fig. 18 a top view of the mounting ring;

Fig. 19 is a view similar to Fig. 5 of another modified transducing or erasing head construction and is a cross section along line 19—19 of Fig. 20;

Fig. 20 is a broken top view of the head shown in Fig. 19;

Fig. 21 is a cross section of Fig. 20 along the line 21—21;

Fig. 22 is a top view of the guide member of Figs. 19 to 21;

Fig. 23 is a cross section of Fig. 22 along the line 23—23;

Fig. 24 is a cross-sectional view analogous to Fig. 5 of a different magnetic head according to the invention in which is used a different magnetic pole construction;

Fig. 25 is a broken top view of the magnetic head of Fig. 24;

Fig. 26 is an enlarged sectional view of the magnetic core sub-assembly of Fig. 24;

Fig. 27 is an end view of the magnetic core of Figs. 24, 25 and 26;

Fig. 28 is a cross-sectional view along the line 28—28 of Fig. 29 of a magnetic head according to the invention which head is particularly suited for use with a record track in the form of a tape;

Fig. 29 is a cross section of Fig. 28 along the line 29—29;

Fig. 30 is a sectional view of a different magnetic head of the invention for use with a magnetic record tape;

Fig. 31 is a top view of the head of Fig. 30;

Fig. 32 is a view similar to that of Fig. 30 of a modified pole piece construction; and Figs. 33 and 34 are views of a further modified pole piece construction.

In the manufacture of magnetic recorders, the construction of the magnetic core is one of the critical steps in that the operation of the finished machine is direcly governed by the properties of this magnetic core. The magnetic core includes a non-magnetic gap along which a moving magnetic record track is magnetically linked with the flux in the core, and the operation of the machine is affected by the disposition of this small non-magnetic gap. The careful construction of magnetic cores in large quantities and of substantially identical characteristics has been one of the stumbling blocks in the mass production of inexpensive magnetic transducing devices inasmuch as this careful construction requires laborious manual adjustment of each core. The characteristics of the core are, furthermore, subject to change during use when the core is supported and disposed against a supporting structure which changes in dimension with variations in temperature and/or humidity.

In the apparatus of the invention the magnetic core of the transducing head includes a unitary sub-assembly that can be integrally made on a mass production basis and with substantially no variation in transducing characteristics. This sub-assembly is easily mounted and held in place in a transducing head.

In Figs. 1, 1A, and 1B is shown diagrammatically a magnetic recording and reproducing arrangement combined with a transducer head arrangement of the invention.

A long spirally-coiled magnetic signal recording track, in the form of a magnetic steel recording wire or filament 31, is stored on two reels 32 which are revolvably mounted in a self-supporting reel holder unit, shown in the form of a casing 33, so that by rotating one reel the wire will be wound thereon while it is being unwound from the other reel.

The recording wire 31 is maintained under tension and is guided through a magnetic transducer head 35 which is shown carried by a substantially rigid flat arm 34 having a rear end portion pivotally secured to a portion of the holder casing 33 so as to make it possible to impart to the magnetic head assembly 35 an up-and-down oscillatory or reciprocatory motion for distributing the recording wire 31 along the height of a reel 32 while it is being wound thereon from the other reel.

The holder casing 33 is arranged for detachable coupling to a motor unit 36, for instance, in the manner described in the application of S. J. Begun, Serial No. 644,600, filed January 31, 1946, now U. S. Patent No. 2,419,476, granted April 22, 1947, so that either one of the reels 32 may be selectively rotated for winding thereon the magnetic recording wire 31, while assuring that the wire 31 is always held under tension. The motor unit 36 has a cam, not shown, which rotates at a speed correlated to the rotary motion of the reels 32, and the cam imparts through a follower rod 38 the required up-and-down oscillatory motion to the transducer assembly 35 which is held biased against the upwardly projecting end of the follower rod, as by a biasing spring forming part of the pivotal connection between the arm 34 and the wall of the holder casing 33.

Various magnetic transducer head arrangements for magnetic recording and reproducing have been suggested in the past. The transducer head arrangement most commonly used in the past employed two magnetic pole pieces spaced by an extremely small magnetic gap and placed on the opposite sides of a moving signal carrier, such as a wire or tape, and windings interlinked with the pole pieces carried the electric signals to be recorded or picked up.

Such magnetic heads have, however, been superseded by so-called ring-type magnetic transducer heads which use ring-like or closed-circuit magnetic cores provided with a magnetic gap and placed with the gap tangentially on one side of the moving record track so as to magnetically interlink the transducer head windings surrounding the core with a moving element of the record track bridging the magnetic gap. The use of such magnetic heads for magnetically recording with magnetic tapes or wires is described in the two German A. E. G. Patents 617,796, issued in 1935, and 660,337, issued in 1938, and the desirable operating characteristics of such ring-type magnetic heads have been described in an article by H. Lubeck, published in "Akustische Zeitschrift" of November, 1937, pages 273–297.

It was also long known that in recording magnetic signals, a better signal-to-noise ratio is obtained if, in lieu of a D. C. biasing current, a high-frequency alternating biasing current is superposed on the recording current, as described, for instance, in the U. S. Patent 1,640,881 of Carlson et al.

The superiority of recording with A. C. biasing current is probably due to the phenomenon illustrated by the curves of Figs. 2 and 2A. Fig. 2 illustrates the effect of superimposing high-frequency alternating fields on the hysteresis loop of magnetic material obtained in the absence of superposed alternating current magnetization. Curve B—2000 is a hysteresis loop of the same magnetic material obtained when the magnetic material was subjected to an alternating magnetizing current which produced an alternating magnetic flux having an induction of 2000 Gauss. A further increase of the alternating magnetization results in the loop entirely collapsing into a line curve B—A shown in dash lines.

In Fig. 2A are shown magnetization curves of magnetic material under superposed alternating fields. Curve B—0 is a magnetizing curve of the magnetic material obtained in the absence of a superposed alternating field, and this curve has a sharp knee in the region below and above zero. Curves B—1 and B—8 show the magnetization curves of the same material obtained while a smaller or larger alternating field was superposed on the material. These curves show that the apparent maximum permeability reaches a maximum, as indicated by curve B—1, as the alternating flux increases, and that further increase of the alternating flux results in a decrease of the permeability, as indicated by curve B—8.

Since magnetic recording is generally used for recording audible frequencies, the superposed alternating biasing field is so chosen that its frequency is above the audible range, such as about 20,000 cycles.

Fig. 3 illustrates in diagrammatic form one practical method of operating a magnetic recording system in accordance with the invention wherein A. C. biasing is used for recording. The recording medium 31 in moving from one reel to another, is guided past the pole face region of an erasing head 35E and the pole face region of a recording or play-back head 35R. Both heads may be mounted in the head assembly 35 and may be equipped with a channel or groove so as to assist in guiding the moving record track. A switch 91 having four poles and two positions is connected so that in the "Record" position (lefthand position as shown) one pole 91—1 connects a high-frequency oscillator 90 with a source of power, indicated by the circled plus sign; another pole 91—2 connects microphone 93 with the input side of amplifier 94, and the pole 91—3 connects the output side of the secondary recording amplifier 94R with the recording head. The high-frequency currents are led to the erasing head directly, adjustable condenser 96 bypassing some of the high-frequency currents to the amplifier output to provide the necessary high-frequency A. C. bias to the signals being led to the recording head. The recording medium is subjected to a high-frequency magnetic flux as it passes the pole gap at head 35E. This flux is strong enough and has a frequency high enough to place the moving medium in a magnetically neutral condition. As the medium, now magnetically neutral passes the pole gap 54 at the recording head 35R, it is exposed to a magnetic flux corresponding to the signal current with superimposed high-frequency current, and successive portions become permanently magnetized and exhibit a magnetic flux which varies along the medium in accordance with the signal current variation with time. To play back the recording, the medium is rewound and then unreeled in the same sequence over the recording and play-back head 35R, with the switch 91 in the "Reproduce" position. The high-frequency source 90 and microphone 93 are disconnected, the head 35R is connected to the input amplifier 94, the output of which is connected to the reproducing device 97, which can be a loud speaker, through an intermediate secondary play-back amplifier 94P. The capacitor 96 is adjusted to present an impedance to the signal voltage sufficiently high to prevent the appearance of any appreciable signal flux in the erasing head 35E, although for the higher biasing frequency sufficient coupling is obtained.

The secondary amplifiers 94R and 94P may be used to control the recording and play-back amplitudes at the different frequencies in the desired range of frequencies so as to obtain higher fidelity, as more fully described in the copending application No. 685,092, filed July 20, 1946, by Otto Kornei, entitled "Magnetic Recording and Reproducing."

The magnetic transducer head of the present invention makes use of the fact that best results are obtained if a minimum of magnetic material is used in the magnetic circuit of such recording head.

The effectiveness of the magnetic recording and reproducing process depends on the cooperative maintenance of stable operating conditions between the diminutive magnetic gap region of the magnetic transducer head and the diminutive magnetic record track element bridging the gap. These conditions are extremely critical, and the difficulties encountered in their operation are greatly increased when the recording and reproducing process is carried on on a thin wire or filament, and particularly when the magnetic head is also utilized for distributing the wire as it is being transported from one reel to the other.

In all types of magnetic transducer heads, the short length of the moving signal carrier, which is magnetically interlinked with the transducer head core, may be designated as the effective magnetic slit and it differs somewhat from the actual magnetic gap extending between the tips of the pole pieces. The magnetic slit width which determines the effectiveness of the magnetic recording process, depends on the magnetic field distribution in the region between the diminutive pole-piece gap and the record track element bridging the gap, and this field distribution is determined by the character of the contact conditions between the pole pieces and the moving magnetic record element in the region of the diminutive gap.

Because of these critical difficulties, prior magnetic record transducer heads could not be manufactured in quantities in a manner that would make it possible to obtain with them uniform recording and reproducing characteristics without special adjustment of each individual head, depending on the various different individual deficiencies and difficulties exhibited by it when subjected to actual conditions of use. Each heretofore available magnetic transducer head required a great deal of adjustment before it would meet specific requirements, and the tolerances which had to be allowed to meet these requirements were rather great. For example, in prior magnetic transducer heads, it was difficult to obtain equally good high-frequency response and in some cases a given transducer head would cut off for much lower frequencies than another transducer head of substantially identical construction, and the variations in the cut-off frequency were as much as 25% or even more.

A further important factor responsible for the critical difficulties encountered in the magnetic recording process is the fact that the transducer heads require pole pieces made of a metal having a high permeability or mu, the magnetic sheet material of the pole pieces being in most cases a special nickel-iron alloy. These alloys have to be properly annealed in order to give them their high mu characteristics. Any stresses imparted to such material after annealing will change its magnetic performance characteristics.

When the magnetic recording process is carried on with a wire, additional critical conditions are created by the fact that the wire, on moving over the pole pieces, wears into the relatively soft magnetic pole-piece material a groove. As a result, erratic magnetic conditions develop in the critical magnetic gap region of the pole pieces.

The magnetic transducer head arrangements of the invention, the novel features of which will be described hereinafter in connection with various exemplifications thereof, make it possible to manufacture magnetic transducer heads that are very effective in recording on wire, producing a high signal-to-noise ratio, without requiring laborious individual adjustment of each head, and such heads of the invention have proven effective in overcoming the various critical difficulties of the prior magnetic transducer heads.

The magnetic transducer head assembly 35 is shown in detail in Figs. 4 to 11 and constitutes a substantially rigid, generally flat, block-like guide structure provided on one elongated side with an elongated guide channel 40 having two outwardly-tapering guide surfaces 41 extending from an elongated, narrow channel 42 forming the deepest region of the guide channel 40. The elongated, narrow channel 42 has a width of the order of the thickness of the signal carrier filament 31 and is so designed as to serve as a positive elongated guide surface which engagingly supports and guides a substantial length of the filamentary recording track 31 as it moves through the transducer head.

In the arrangement shown, the block-like guide structure of the transducer head 35 is formed by two wall members 43, 44, held suitably clamped to each other as by a plurality of screws 45, and holding therebetween an assembly of two, thin, flat pole pieces 51 and transducer windings shown formed of two coils 53 mounted on and interlinked with the magnetic core structure formed by the two pole pieces. The magnetic transducer head shown is intended for recording as well as for reproducing, and its thin, flat pole pieces 51 are of highly-permeable magnetic sheet material. The thickness of the pole pieces is of the order of the thickness of the wire filament 31. The two pole pieces 51 are held longitudinally aligned in a plane on the opposite sides of a narrow, non-magnetic gap 54 of the order of .001 inch width.

The outwardly-facing edge surfaces of the pole pieces which border the gap 54 are convexly curved so as to constitute two elongated pole faces 55 arranged to be tangentially engaged by a portion of the magnetic recording wire filament 31 moving past the gap 54.

Since the magnetic material of the pole pieces is much softer than the material of steel wires of the type used as filamentary magnetic recording tracks, the motion of such recording wire on the softer magnetic pole-piece material wears away the magnetic material of the pole pieces, and will, after a period of use, form in the pole faces 55 a groove 57, such as is shown in Fig. 8, which supports the wire 31 better than a flat pole-face surface. In making magnetic recording heads of the type shown, the central flat surface region of the elongated pole faces 55 is preshaped or pregrooved for assuring that the moving wire filament is guided along the central region of the narrow pole-face edge surfaces 55. The larger contact area so produced diminishes the rate of erosion of the pole pieces and helps to maintain a substantially constant magnetic linkage between the record track and the magnetic gap and pole pieces. When recording on a wire which is about .003 to .006 inch thick, the pole pieces may be made about twice the thickness of the wire, for instance, about .010 to .014 inch thick.

In order to maintain uniform operating conditions for a long period of operation during which the pole-face portions 55 of the pole pieces 51 are worn out, the narrow magnetic gap region 54 adjoining the pole faces 55 is made by substantially parallel, facing edge portions of the pole-piece ends so as to provide an outer, parallel, narrow gap region of substantially uniform magnetic reluctance which does not materially change even if the wire wears a deep groove in the pole face region 55 of the pole pieces 51 along which it moves.

Each of the two transducer winding coils 53 is wound on a block-like bobbin member 56 having a slit 67 in which the pole pieces 51 are placed so that the bobbin body serves as a mechanically strong support for its associated pole piece 51.

In recording, the recording signal currents traversing the transducer coil 53 impress on the successive elements of the moving magnetic recording filament 31 bridging the recording gap 54, corresponding magnetizing forces which convert it into a succession of elemental magnets or magnet waves corresponding to the recorded signal currents. In reproducing, the coercive magnetomotive forces of the succession of magnetic record waves passing the pole-piece gap 54, force through the core structure of the pole pieces 51 and its surrounding windings 53 corresponding magnetic flux waves which induce in the transducer windings 53 voltage waves corresponding to the recorded signals.

In the reproducing process, it is important to assure that the gap region 54 extending between the edges of the pole-piece ends facing the gap 54 shall not shunt away the magnetic flux waves which are induced in the pole pieces by the successive magnetic wave elements of the record filament 31 moving past the gap 54. To this end, the edges of the pole portions are tapered along their inward region to provide a wide tapered gap region 54—1 having relatively great reluctance compared to the magnetic path of the core structure which is interlinked with the transducer winding 53.

The two bobbin members 56, with the pole pieces 51 held therein, are shown united to a common mounting member shown in the form of a ring 61 so as to constitute therewith a self-supporting, detachably removable, double pole-piece sub-assembly holding its pole pieces in their proper operative relationship. This mounting may be effected by cementing, using a thin layer of cement having a high curing temperature, such as commercially available synthetic resin cements which may be cured and hardened at relatively high temperatures, such as 200° C., under pressure of the order of six pounds per square inch. The mounting member 61 may be made of a suitable molded synthetic resin material which is stable against humidity and temperature changes, synthetic resin materials having one or more layers of fabric impregnated with a suitable resin being particularly suitable. The ring 61—1 may be of brass or other non-magnetic metal, and mounted by screws or rivets or by cementing, spot welding, or soldering the pole pieces 51 to the metal ring directly. Although not necessary, an overlying ring 61—1 is shown in Figs. 5 and 5A as completing the double pole-piece sub-assembly unit. The ring 61—1 may be secured as indicated for mounting the ring 61 or by clamping the two rings together by means such as the screws 61—2, shown in Fig. 5A. Both rings 61 and 61—1 may be metallic, it having been discovered that no significant eddy current losses take place so long as the metallic rings are kept far enough away from the non-magnetic gap. The spot welding operation has also been found not to significantly affect the magnetic properties of the core.

The two pole-piece bobbin units so united to the common mounting member 61 form a self-supporting double pole-piece unit which maintains all critical elements of the transducer structure in their critical aligned, stable operating conditions. The double pole-piece unit is arranged to be held within the substantially rigid supporting structure shown formed by two wall members 43, 44, having in their interior a cavity space 46 within which the assembled double-pole-piece bobbin unit is firmly held in its operative position so as to expose the pole faces 55 adjoining the operative gap 54 to portions of the magnetic recording track as it moves over the channel track 42, in the manner indicated in Fig. 4.

Thin spacer layers of compressible material, such as neoprene, may be placed on the inner surfaces of the wall members 42, 42 facing the cavity to permit the self-supporting double pole-piece assembly to assume its proper position within the cavity without subjecting the end portion of the pole pieces which is clamped between the two wall members to excessive strains.

The double pole-piece unit is arranged to be held between the wall members 43, 44 of the magnetic head structure 35, with the two aligned pole faces 55 exposed along an intermediate portion of the narrow channel track 42 in such manner as to expose the pole faces 55 into operative engagement with the elements of the record track filament 31 moving and guided along the narrow channel track 42. The outwardly tapered guide surfaces 41 of the guide channel structure 40 are so designed that a tensioned length of the signal carrier track 31, which is biased toward the channel structure 40, is automatically guided by the guide surfaces into positive guiding engagement with the long, narrow channel track 42 forming the deepest part of the channel structure. The taper of the guide surfaces 41 is so designed and correlated to the shape of the narrow channel track 42 as to cause a thickened track element, such as a splice joining two ends of a wire forming the record track, to be lifted outwardly from the narrow channel track 42 and cause the splice to ride along the outward regions of the tapered deflecting surfaces 41, while moving through the transducer head. In addition, the taper of the guide surfaces 41 is so chosen that the guide surfaces present to a wire protrusion deflected thereby a support which prevents forces exerted by the tensioned moving wire 31 from wedging a wire protrusion within the narrow inward region of the guide channel 40.

As shown in Fig. 7A, the bottom of the narrow guide channel track 42 is shown formed by the narrow edge surface of a sheet 71 of hard material, such as Phosphor bronze, which is held clamped between the two wall members 43, 44 so that the narrow edge surface of the sheet member 71 is exposed along the deepest region of the guide channel 40 and serves as the guide support of the narrow guide channel track 42. The sheet member 71, which provides the guide surface of the guide channel track, is of substantially the same thickness as the sheet material of the pole pieces 51 and is held aligned with them between the two wall members 43, 44.

Figs. 8 and 8A are enlarged transverse cross-sections of the pole-piece region and the guide track region of the transducer head of another embodiment of the invention in which the thickness of the sheet material of the pole pieces 51 and of the guide sheet 71 is made of the order of twice the thickness of the cross-sectional width of the recording track 31, and the facing sides of the two rigid wall members 43, 44, which hold them in their operative position, are provided with wall protrusions overlapping the edges 55 of the pole pieces 51 and the guide sheet 71 so as to form a channel 49 to guide the narrow magnetic record track filament 31 along the central region of the narrow edge surface of the pole pieces 51 and the guide sheet 71. The wall portions 49, 49 may be omitted, as shown in Fig. 9, and the groove in the pole pieces deepened, as indicated by 157, to assist in guiding the wire. The guiding insert 71 may also be made wider, as shown in Fig. 9A, by member 71—2, the guiding face of 71—2 being then shaped to form a guiding groove 71-3.

In the transducer head arrangement shown in Figs. 4 to 13, the coil bobbin structure 56 of each of the pole pieces 51 is utilized to form a firm support for its thin pole piece. This is particularly important if highly-permeable magnetic material, such as Permalloy or Mu metal, is used for the core structure of the pole pieces.

The slit 67 in each bobbin 56 may be made large enough to admit the entire pole piece 51. With the pole-piece construction illustrated, however, difficulties may arise if the pole piece is to be inserted after winding the coil 53 on the bobbin. The bobbin, according to a modified construction, may have a slit only wide enough to admit the straight shank portion 58. Fig. 12 illustrates such a construction, in which the pole piece is made in two equal half-units 65 which are inserted into the slit from opposite ends either before or after winding the coil. A more closely fitting slit makes for a bobbin of increased strength having a greater support for the pole pieces. The two pole-piece half-units forming the gap 54—A may, if desired, be replaced by a single U-shaped unit, in which case the slits 67 should be slightly wider than the shanks to permit adjustment of the gap 54.

Instead of making the bobbin structure 56 of one piece, it may be made of two longitudinal halves with a pole-piece recess on an inwardly facing side of the two bobbin halves, and they may be united to each other around the pole piece 51 so as to form a spool-like structure around which the coil may be wound. There are available a number of synthetic resin materials which do not undergo material dimensional variations under changing temperature and humidity conditions, and such moldable synthetic resin materials may be used for molding bobbin members 56.

Both spool halves may be made of the same shape, and the two matching halves may be cemented to each other on the opposite sides of the pole pieces, a flat recess between the facing wall surfaces of the two spool halves providing the elongated space within which the flat pole piece is firmly retained and protected. Either or both bobbin sections may be made of a non-magnetic metal, the eddy current loss being kept low when the metal section or sections are sufficiently shorter than the pole piece. Fig. 13 shows such a construction, wherein the lower bobbin section 59 is metallic.

When two such bobbin half-structures are united to the opposite sides of the pole pieces held between them and to each other, they constitute a firm, rigid pole-piece bobbin unit which has a great degree of stability and which does not require any careful handling when winding thereon the coil, or in assembling it, by mass production methods, into the transducer structure.

The single sheet metal pole-piece construction is a desirable commercial feature but the pole pieces may also be made by laminating very thin layers to a total thickness of the order of the recording track viz., 0.006 to 0.014 inch.

It should be noted that the cross-section of the magnetic recording filament 31 need not be made circular, as in ordinary wires, but may have a flat tape-like form, in the manner shown in Figs. 10 and 10A and disclosed in the application of A. L. W. Williams and S. J. Begun, Serial No. 546,808, filed July 27, 1944. It has been found that magnetic heads of the invention of the type described herein are very effective in recording or reproducing signals with magnetic recording filaments of either round or flat cross-section. According to a further modification of the invention, the magnetic record track may be in the form of a flat tape, in which case several pole pieces of the kind illustrated in Figs. 7, 8, 10 or 14 may be superimposed so that the total thickness of the superposed units is equal to the desired width of a magnetic track to be utilized in the form of tape. This laminated construction has been found to give excellent results with magnetic tapes that are either metallic, or limp coated non-metals such as paper, or limp self-sustaining films containing dispersed magnetic powder.

In the transducer head shown in Fig. 4, each pole piece 51 is surrounded with its coil 53 and is so arranged that it forms one-half of a balanced, substantially closed, magnetic circuit including two like gaps 54, 54—A. Each pole piece and surrounding coil unit is alike, preferably identical, and the two coils of a single head are connected together oppositely (front-to-back) so that the flux induced by the flow of recording current in one coil reinforces that induced by the same current in the other. Since the windings are physically parallel, any stray magnetic or electric fields external to the coils will induce a flux in one pole piece that opposes and will substantially cancel that in the other. Stray electric fields and magnetic fluxes will also directly induce flux in the magnetic core without the help of the winding and produce a high noise level, especially during playback when the signals produced by the movement of the magnetic record track are very weak. By making the magnetic core symmetrical in the plane of its thickness, such disturbances are balanced out. The symmetry is seen in the fact that for every portion of the magnetic circuit in the core, there is another equal or balancing portion on the opposite side of the circuit. This is of the nature of radial symmetry in the plane of the core, around its center and having two radii. Induction in the magnetic leg containing the gap 54, for example, is opposed by an equal flux induced in the leg containing the gap 54—A when the gaps have the same reluctance. To secure perfect balance, the opposite gap 54—A may be bridged by a magnetic element 31—A proportioned so as to be equivalent in its effect to the magnetic signal carrier element bridging the effective gap region 54 along which the record track 31 is impelled during the recording and reproducing process.

The magnetic head shown in Figs. 4 to 10 is very effective in suppressing disturbing leakage fluxes and cross-talk.

As shown in Figs. 4, 5, 8, 9 and 10, the gap regions of the two pole pieces 51 project beyond the mounting rings 61 so that the exposed portions of the aligned pole pieces 51 bordering the gap region may be positively engaged and held in their operative position along the guide channel track 42 by the overlying parallel surface portions of the wall members 43, 44 extending inwardly from the channel track region 42 along which the pole faces 55 are exposed.

Contrary to expectations, it has been found that a magnetic record transducing head of the type described above, using a balanced magnetic core structure, operates very efficiently for recording with high-frequency biasing currents, notwithstanding the fact that the magnetic pole pieces are united by soldering to a common, rigid, metallic mounting member, such as the mounting member 61 shown in Figs. 4 and 5, and no difficulties are encountered due to eddy currents that are induced by magnetic stray fields induced by such high-frequency biasing currents traversing the windings of the coils 53.

Furthermore, it has been found that a transducer head arrangement of the type described above in connection with Figs. 5 and 7 to 11 is also very efficient in obliterating signals of a record track 31 moving past the pole-piece region if the coils 53 are excited with a high-frequency obliterating current of the proper magnitude. Such heads have been found very effective in obliterating records made on wires having a diameter of about six mils when using an obliterating current of a frequency of about 20,000 cycles or more per second.

In order to obliterate with A. C. flux, the apparatus is so arranged as to produce an A. C. obliterating flux of such character that when a record track moves past the pole gap along the channel track 42 of the transducer head, each record track element passes through an A. C. obliterating field which is so distributed that the record track is first subjected to saturation and then subjected to a decaying alternating magnetic field which restores it to a neutral condition. The frequency of the obliterating current sent through the coil winding is so related to the speed of the record track 31 that the magnetic field produced in the pole gap extends along a path equal to a substantial number of wavelengths of the obliterating field.

As described in Fig. 3, two heads may be mounted on a head assembly 35, one head being used for erasing and the other for recording and playing back.

The magnetic record transducing head described above embodies a number of important features. The length of the narrow track channels 42 extending on both sides of the aligned pole faces 55 is made sufficiently greater than the length of the pole faces 55 engaged by the moving filament 31, and their relative surface levels and shapes are so designed and correlated as to suppress vibrations of the filament element bridging the gap and the transmission of vibrations along the moving filament toward the filament element bridging the gap.

This arrangement assures that the magnetic recording filament, such as a magnetic steel wire, in moving from one reel to another, is led between the tapering guide surfaces 41 of the guide channel 40 into tangential engagement with the narrow channel 42 to assure that the short intermediate portion of a long, positively guided and supported filament length 31, bridging the critical gap region 54 separating the pole faces 55 of the pole-piece structure, is maintained in a vibration-free condition, and that uniform magnetic conditions prevail in the magnetic slit region which focuses and concentrates the magnetic recording and reproducing flux interlinking the short filament element bridging the magnetic slit with the double pole-piece core structure. Furthermore, any propagation of vibrations of the wire resulting from the unwinding and winding-on operations while the wire passes through the head, is suppressed.

The elongated pole-face edge-surface portions of the pole piece 55, which form the two longitudinally-aligned pole faces 55 of the pole pieces 51, are preshaped so as to form therein elongated concave pole-face channels 57 and assure that the wire remains centered in the elongated central region of the narrow edge-surface portions forming the pole faces 55. The walls of the guide structure to which the pole pieces are secured, are made of a non-magnetic material which does not undergo material variations with changes in humidity and temperatures for assuring that the critical magnetic material of the pole pieces 51 is not subjected to strains which impair or vary its magnetic characteristics.

A ceramic or suitable synthetic resin material may be used for the guide channel structure. If the magnetic head is used for recording with direct current bias, a non-magnetic metal of high electrical resistance, such as chrome alloys, may be used for the guide channel structure.

The major area of the elongated channel 42 along which the wire is led towards and away from the magnetic pole faces 55, is formed of non-magnetic material and shaped so as not to introduce any disturbance into the magnetic signal stored in the magnetic signal-carrier filament 31.

Furthermore, the surface material of the channel 42 extending on both sides of the aligned pole-face portions 55, is of a sufficiently greater hardness than the material of the pole pieces 51, and their level is so positioned relatively to the level of the pole faces 55 as to reduce the specific pressure exerted by the filament on the pole faces 55 and to keep it materially smaller than the specific pressure exerted by said filament on the adjoining portions of the record track channel 42.

It has been found in practice that very effective magnetic transducer heads of the invention, suitable for magnetic recording with A. C. biasing and obliterating current, may be made with flat pole pieces, each of which is formed of a single magnetic sheet lamination, in the manner indicated in Fig. 4, and having a thickness of approximately the same order of magnitude as the thickness of the magnetic wire 31.

In magnetic recording applications involving the use of high-frequency erasing and biasing currents, or recording, and the reproduction of high-frequency signals, undesirable eddy currents may be more fully suppressed by making each of the pole pieces 51, or, in general, each of the magnetic core elements of the magnetic transducer head, from a plurality of laminations which are as thin as practically possible.

Fig. 14 shows a magnetic transducer head of the type described above having pole pieces 51—2, each of which is formed of a plurality of superposed thin laminations. The over-all thickness of the pole pieces 51—2 is about twice the thickness of the recording filament 31, and the thickness of each lamination is a fraction of the thickness of the recording filament 31. The two pole pieces 51—2 are shown secured in their proper operating position between two side walls 43, 44 of the guide channel structure. Furthermore, as in the arrangement of Fig. 8, the inward region of the channel side walls 43, 44 is provided with wall protrusions 49 which overlap the edges of the pole faces so as to positively guide the moving wire 31 along the center region of the elongated pole faces in the manner explained above.

In order to assure that the two pole pieces are rigidly supported in their proper operative position with the required gap spacing within the transducer head, the two pole pieces are suitably secured and united to at least one rigid mounting member so that they consitute with such mounting member a substantially rigid, self-supporting, unitary, double pole-piece structure.

In making a double pole-piece structure by soldering the pole-piece elements to a rigid, ring-shaped, supporting structure in the manner described above, it is important to use a soldering material with a low fusion temperature in order to assure that the heating accompanying the soldering operation does not affect the magnetic characteristics of the pole-piece material. The initial pole-face channel should be formed on the two aligned pole faces after they are united to their rigid supporting structures, and the pole pieces have to be annealed before they are soldered to the support and before their aligned pole faces are subjected to the pole-face channel shaping operation which should be performed with low forces to assure that the magnetic pole-piece material is not subjected to disturbing strains.

Alternatively, the magnetic pole-piece elements may be secured to their supporting structure by a high-temperature treatment, such as an electric welding process, and the materials of the supporting structure as well as the bobbins and windings are so chosen that they may be subjected together with the magnetic pole pieces united thereto to the annealing process. The supporting structure may be made sectional, the sections to which the pole pieces are attached permitting the subsequent winding of the coil on the bobbin; the high-temperature pole piece fastening treatment being followed by annealing to obtain the desired high permeability, after which the coils are wound and the sections assembled without a high-temperature operation.

The over-all thickness of the pole-piece portions having the pole faces 55 may be made large enough so as to provide on both sides of the pole-face channel 57 narrow wall portions of highly-permeable magnetic material having a thickness required for maintaining the moving wire in a uniform magnetic condition with respect to the pole-face portions of the pole pieces. Thus, when using, for instance, a magnetic signal-carrier wire 31 which is six mils thick, very good and uniform operating results are obtained with pole pieces 51 made from a magnetically, highly-permeable sheet about .012 inch thick and containing in the pole faces 55 channels 57 .006 inch wide, so that the moving wire shall fit between the highly-magnetic channel wall portions which are .003 inch thick.

In order to secure good efficiency in the reproducing process and maintain uniform operating conditions for a long period of operation during which the pole-face channels 57 may be deepened as a result of wear, the magnetic gap formed between the end-edge surfaces of the pole pieces 51 facing the gap has an outer, parallel, gap region 54 of substantially uniform magnetic reluctance and an adjoining inner divergent gap region 54—1 of greatly increased magnetic reluctance. The inward distance of the parallel gap region 54 is made sufficient to permit the pole-face channel to wear in deeper without significantly changing the magnetic flux interlinkage conditions between the wire element 31 bridging the gap 54 and the adjacent pole-face portions 55.

By using a magnetic core structure and pole pieces of highly-permeable magnetic sheet material having a thickness of the order of the thickness of the thin magnetic recording wire, such as from one-half to about four times the thickness of the wire, a magnetic transducer head of the type here described is very effective for magnetic recording with A. C. biasing and obliterating current, and the eddy current losses in the magnetic material of the core structure are kept down to a practically negligible level suitable for general practical use. Such magnetic head construction is also very effective for magnetic recording on wire with D. C. biasing and obliterating current.

The wall material of the guide surfaces 41 should be of a character which exhibits great wear resistance and toughness. Ceramics and various commercially available, non-magnetic, electrically insulating, molded synthetic materials, such as molded phenolic condensation products, have the properties required for this purpose.

When used for recording with D. C. biasing current, the guide surface members may be made of metal, and the guide surfaces 41 may be provided with a hardened guide-surface layer, for instance, by alloying the surface of the metal with a layer of hard wear-resisting material, such as chromium, which withstands wear when it is traversed by a steel wire protrusion. Alternatively, the hardened surface layer may be formed on the guide surfaces of the guide members by a plating process. The exposed pole faces 55 of the pole pieces 51 may be likewise provided with a surface layer of hard wear-resisting material formed thereon by a plating process.

Although a magnetic transducer head of the type described above does an excellent job of erasing, it may be readily combined with a much simpler form of record obliterating means as shown in Figs. 4 and 6. This obliterating means has two magnetic core elements or pole pieces 81, 82 shown as a part of a substantially closed magnetic circuit provided with two pole faces 83 bordering the gap 84 extending over a portion of the length of the guide channel track 42 so that during the recording process each element of the magnetic signal track 31 moving along the guide track 42 toward the transducer head pole faces 55 first passes through the gap 84 of the obliterating core structure 81, 82. The obliterating gap 84 is sufficiently wide so that the record track 31 moving past the gap does not make contact with the pole faces 83. The spool-wound obliterating coil 85 is placed on one of the pole members 81, 82. The two core members 81, 82 with the coil 85 mounted thereon may be assembled as a unit, as by placing two clamping straps 86 of suitable material around the assembled core members 81, 82, a spacer element 87 holding the two core members at their proper spacing so that their pole faces 83 are held properly spaced across the obliterating gap 84.

The core structure of the core elements 81, 82 is made of thin magnetic laminations, such as silicon steel, of a few mils thickness. The laminations of the core structure may be assembled side by side in the manner shown for the pole piece 51—2 in Fig. 14. Alternatively, the two core members 81, 82 may be formed by winding a long strip of thin magnetic foil material into a coil-like core and cutting it thereafter into two separate core members 81, 82 of the form shown. They may be also manufactured in a manner similar to the Hypersil cores manufactured and sold by the Westinghouse Electric and Manufacturing Company.

An obliterating head of the type shown in Fig. 6 is very effective for obliteration by A. C. flux which erases all previous recordings of each record track element passing through the gap region 84 between the two pole faces 83 for restoring the magnetic material of the record track 31 to a neutral condition. By making the area of one or both pole faces 83 somewhat smaller than the cross-section of the core elements 81, 82, an A. C. obliterating field which is of high strength in the central region of the pole faces and has the desired decaying characteristics at the end regions thereof may be readily obtained.

The magnetic head construction of Figs. 5, 7 and 11 may be provided with interfitting portions to improve the speed and ease with which it may be assembled. By way of illustration, one of the rings 61, 61—1, may be provided with projecting portions which fit around the pole pieces 51 and into the opposite ring. In Figs. 15 to 23 is shown another form of magnetic transducer head based on the principles of the invention. A double pole piece sub-assembly is formed of two pole pieces 51 each confined within a bobbin unit 61—2 serving as a protective mounting support, the two bobbin units with the pole pieces being secured in their properly aligned position to a common mounting member so as to constitute therewith a self-supporting detachably removable double pole piece unit holding its pole pieces assembled in their proper operative relationship. Each of the two transducer winding coils is wound around a block-like bobbin member 61—2 as indicated at 62, shown in detail in Figs. 15 to 17, having a slit 167 in which the pole piece 51 is placed so that the bobbin body 61—2 serves as a mechanically strong support for its associated pole piece 51. The double pole piece assembly is held clamped in its operative position between two wall members 143, 144 which are suitably secured to each other as by screws 145.

As shown in Fig. 21, the lower wall member 144 is shown made of metal and is provided on the side extending along the guide channel with a wall region 44—2 having a height equal to the height of the two assembled wall members 143, 144, the wall member 143 fitting within the confines of the lower wall member 144.

In the transducer head arrangement shown in Figs. 15 to 23, the coil bobbin structure 61—2 of each of the pole pieces 51 is utilized to form a firm support for its thin pole piece. This is particularly important if highly permeable magnetic material, such as Permalloy or Mu metal, is used for the core structure of the pole pieces.

Instead of making the bobbin structure 61—2 of one piece, it may be made of two halves with a pole piece recess on an inwardly facing side of the two bobbin halves, and they may be united to each other around the pole piece 51 so as to form a spool-like structure around which the coil may be wound.

Both spool halves may be made of the same shape and the two matching halves may be cemented to each other on the opposite sides of the pole pieces, a flat recess between the facing wall surfaces of the two spool halves providing the elongated space within which the flat pole piece is firmly retained and protected.

When two such bobbin half structures are united to the opposite sides of the pole pieces held between them and to each other, they constitute a firm rigid pole piece bobbin unit which has a great degree of stability and which does not require any careful handling when winding thereon the coil or in assembling it, by mass production methods, into the transducer structure.

In this form of the invention, each pole piece 51 is mounted in a member 61—2, a transducing coil is wound around the central cylindrical portion 62 of the member 61—2, and a pair of the resulting combinations fitted into place in the ring 61—3 so that lower projections 161 are fitted within and engage the interior walls 147 of the ring 61—3 to make a unitary magnetic head. Openings 63 which are provided in the ring 61—3 and corresponding aligned passageways 65 permit the fastening of the sub-assembly in its proper position, against the retaining wall member 144, as shown in Fig. 19.

As shown in Fig. 22, the guide channel member 140, which is preferably of hard wear-resisting material, such as ceramic or metal, is of arc shape and has formed thereon on the side facing the cavity 146 of the transducer head an arcuate surface 70 of smaller radius which forms the front part of the cylindrical cavity within which the pole piece assembly is held.

The guide channel structure 140 also has formed on its convex side a generally V-shaped groove bounded by two tapering guide surfaces 141 and the central region extending in front of the aligned pole faces 55 of the two pole pieces has formed therein a narrow slit 42—1 through which the recording track 31, such as the thin wire, is guided into engagement toward and from the pole faces 55 of the two pole pieces.

As indicated in Figs. 19 and 23, the slit 42—1 formed in the central region of the guide channel 140 is just enough to accommodate and positively guide the narrow track filament, being so combined with the guide channel region bounded by the tapered guide surfaces 141 that a filament protrusion, such as a wire splice, is automatically lifted from the narrow channel slit 42—1 and guided along the tapered guide surfaces 141 past the pole face region of the pole pieces.

The alignment of the narrow guide channel track 42—1 of the guide channel structure 140 with the narrow pole face channel 57 formed on the pole faces 55 in the manner indicated in Fig. 8 presents a critical problem, particularly since the magnetic material of the pole pieces is very sensitive to strains and its magnetic properties deteriorate when subjected to strains. The magnetic head arrangement of Figs. 19 to 23 eliminates these difficulties by simplifying the problem of aligning the narrow channel track 42—1 of the guide channel structure with the central region of the pole faces 55 formed along the narrow edges of the pole pieces. As shown in Figs. 23 and 20, the concave surface of the guide member 140 is provided with a slit 142 aligned with slit 42—1, and the flat pole pieces 51 are provided with lateral projections 51—2 projecting outwardly at the same level and in such manner as to enter into the slit 142 formed in the channel structure 140 along the same level as the record track guide slit 42—1 on the side of the channel structure facing the pole pieces on the same level therewith.

In other words, by forming the rigid guide channel structure 140 with an outwardly-opening narrow record slit 42—1 as well as an inwardly-opening slit 142 aligned with it in the plane of the pole pieces, the guide channel may be readily placed so that its inwardly-opening pole-piece slit 142 engages the pole-piece projections 51—2 extending from the double pole-piece assembly held in its position on the rigid supporting wall member 144, and the guide channel structure 140 may be secured thereto by the screws 40—1 in the properly aligned position.

The holes of the guide structure 140, through which the screws 40—1 with which it is secured to the transducer head structure 44—2 extend, are provided with clearance to enable ready assembly and mounting of the guide channel structure on the wall portion 44—2 of the magnetic transducer head so that quick, easy, and accurate mounting of the guide channel structure in the properly aligned position relatively to the transducer head may be effected.

The opening 146 may be absolutely cylindrical if the sub-assembly 66 is to be mounted first on the lower wall member 144, followed by the upper wall member 143 and the guide member 140. However, for simpler mounting, the opening 146 may be extended rearwardly and into member 143, as shown in Figs. 19 and 20, whereby the wall members 143 and 144 and the guide member 140 may first be assembled and the sub-assembly later lowered from above through the opening 146 and slid sideways toward the guide member to its proper operating position, where it may be fixed in place by the screws shown. This sliding causes the pole-piece extensions 51—2 to move into the slit 142. With such a sliding mounting, the wall members 143 and 144 may be made integral and may also be made integral with the guide member 140.

In Figs. 24 to 27 is shown another exemplification of a magnetic transducer head based on the principles of the invention. It has a magnetic core structure comprising two arcuate pole-piece portions 3—51 and a yoke member 3—52 having mounted thereon a transducer winding coil 3—53 so as to record or reproduce a magnetic signal in conjunction with a magnetic signal-carrier wire filament 31 moving tangentially along pole-face channels formed on the pole faces 3—55 separated by the magnetic gap 3—54.

The two pole portions 3—51 are united, as by welding or soldering, to a common, relatively stiff, mounting member shown in the form of a ring 3—61 of a width slightly less than the radial width of the arcuate pole pieces 3—51, so that the outer edge portions of the two pole pieces 3—51 slightly project beyond the outer circular surface of the mounting ring 3—61. The ring 3—61 may be of a non-magnetic, electrically-resistive metal, such as German silver or brass.

The magnetic core parts 3—51, 3—52 and the transducer winding coil 3—53 are held in position in hollow space 3—46 provided between the inwardly-facing clamping surfaces of two wall members 3—43, 3—44 of non-magnetic material, such as a ceramic or molded synthetic resin which exhibits great strength and toughness.

One side of the two wall members 3—43, 3—44 has inwardly-facing guide surface portions 3—41 tapering outwardly from the narrow pole faces 3—55 and forms the intermediate part of the guide channel structure 3—40 designed in the manner described in connection with structure 40 of Figs. 4 and 5. The inward face of the lower wall member 3—44 has upwardly-projecting wall projection 3—65, the outer surface of which define portions of a cylinder and fit the inner circular rim of the pole-piece mounting ring 3—61 so that it may be placed thereon in the properly aligned position shown. An aligning notch 3—47 of the ring 3—61 fits over an aligning protrusion of the wall projection 3—65 to facilitate proper alignment of the double pole-piece ring 3—61 so that the pole faces 3—55 shall be exposed along the narrow guide channel track 3—42 of the guide channel structure 3—40 formed by the outwardly-tapering guide wall portions 3—41 of the two wall members 3—43, 3—44, as in the arrangements described in connection with Figs. 4 and 5.

In addition, the inward face of the lower wall member 3—44 has formed therein two grooves 3—48 for holding in position the magnetic yoke member 3—52 with its coil 3—53, so that when the pole-piece ring 3—61 with its two pole pieces 3—51 are placed in aligned position around the aligning wall projections 3—65, the rear portion of each pole piece 3—51 will make a good magnetic circuit connection with the underlying portion of the yoke member 3—52 along their overlapping regions.

The inner side of the upper wall member 3—43 has a circular recess fitting around the circular rim of the pole-piece mounting ring 3—61 and arranged so that when the two wall members are clamped to each other, the inwardly-facing, non-recessed, flat surface of the wall member 3—43 will clamp the arcuate portions of the two pole pieces 3—51 projecting beyond the mounting ring 3—61 against the corresponding facing surface of the lower wall member 3—44 which engages the lower side of the two pole pieces 3—51.

The yoke member 3—52 with the transducer coil 3—53 are suitably retained, as by cementing, in their proper operative position within the lower wall member 3—44. The upper wall member 3—43 may be held clamped to the lower wall member 3—44 by two screws 3—45 engaging internally-threaded bushings embedded in the lower wall member 3—44. With this arrangement, it is merely necessary to loosen the screws 3—45 and lift the upper wall member 3—43 from the position shown in Fig. 24, whereupon the double pole-piece unit formed by the mounting ring 3—61 and the two pole pieces 3—51 may be removed and replaced by another double pole-piece unit which is retained in its proper operative position by clamping thereover the upper cover wall 3—43 with the screws 3—45.

The transducer head of Figs. 24 to 27 has a guide channel structure 3—40 which provides on each side of the aligned pole faces 3—55, additional filament guide-path elements extending in generally longitudinal alignment with the pole-face guide channels 3—57 and in guiding engagement with a substantial length of the moving filament 31 for performing the various cooperative functions explained above in connection with Fig. 4. The support surface of the narrow guide channel track 3—42 is formed by the edge surface of an inner guide sheet 3—71 which is clamped between the inwardly-facing surfaces of the two wall members 3—43, 3—44 surrounding the pole-face mounting ring 3—61 with its two pole pieces 3—51.

As in the similar arrangement of Fig. 4, the guide sheet 3—71 is of non-magnetic material and has two forwardly-extending arms with outwardly-facing edge surfaces which form the narrow channel 3—42 which guides two substantial lengths of the moving wire filament 31 on both sides of the pole face 3—55.

The thickness of the two pole pieces 3—51 and of the inner guide sheet 3—71 is about twice the thickness of the recording wire filament 31. A narrow guide channel track of a width about equal to the thickness of the wire filament 31, is formed along the wider, outer guide edge surfaces of the pole pieces 3—51 and of the arcuate arms of the guide sheet 3—71 by providing the inner regions of the tapered channel surfaces 3—41 with inward wall protrusions which overlap the surface edges of the pole faces 3—55 and of the sheet 3—71 so as to positively confine the moving wire filament 31 within the central region of these guide edge surfaces, in the manner indicated in Figs. 8 and 8A.

The inner guide sheet 3—71 is made of substantially the same thickness as the pole pieces 3—51 so that its inner circular region may be clamped between the inwardly-facing surfaces of the two wall members 3—43, 3—44 at the same level as the two pole pieces 3—51.

The self-contained, double pole-piece sub-assembly of the different forms of magnetic transducer heads shown, each formed of a rigid mounting member and two pole pieces united therewith, proved of great value in making it possible to build on a mass production basis, magnetic transducer heads having uniform gaps and pole-face regions, and embodies special features which make it possible to manufacture such double pole-piece units on a mass production basis with uniform, highly satisfactory, operating characteristics.

As shown in detail in Figs. 26 and 27, the mounting member 3—61 is provided not only with vertical aligning notches 3—47, but also with radial notches 3—49 located in the diametrically opposite portion of the ring 3—61 in the direction of the gap 3—54 between the pole pieces 3—51. The pole pieces 3—51 are united to the ring 3—61, as by soldering, in the position shown, while held aligned by their notches 3—47 in a suitable jig, so that the edges of the pole-piece ends facing the narrow gap region 3—54 are in direct abutment and the gap is completely closed. After the two pole pieces 3—51 have been so united to their mounting ring 3—61, the ring 3—61 may be placed in a suitable expanding jig in which the inner circular surface of the ring 3—61 may be subjected to predetermined outwardly-directed expanding forces which will bring about a definite, slight, permanent deformation of the ring in the region of the radial notch 3—49 over the gap region 3—54, the magnitude of deformation imparted to the ring being readily so controllable as to spread apart the pole-tip ends of the pole pieces to the desired uniform, small gap distance, such as .001 inch, with a very high degree of accuracy, while producing such double pole-piece unit on a mass production basis.

If desired, the ring need not be spread since, even though the pole portions 3—51 are in contact, the thin film of oxides and adsorbed gases, as well as microscopic roughness, always present, insures a satisfactory magnetic spacing.

When recording with A. C. biasing current with magnetic transducer heads of the type shown in Figs. 24 to 27, eddy currents are induced in the regions of the magnetic core having relatively large surfaces extending more or less perpendicularly to the direction of the magnetic flux field, such as the regions where the flat end portions of the magnetic yoke member 3—52 overlap the end portions of the two pole pieces 3—51. These eddy currents are effectively reduced and their objectionable effect is suppressed by making the magnetic core areas, which extend perpendicular to the direction of an induced A. C. flux, in the form of subdivided area elements separated by electrical insulating gaps extending in directions perpendicular to the direction of the eddy current voltages induced therein.

In one form of such subdivision, the overlapping end portion of a pole piece 3—51 and of the yoke member 3—52 is provided with very thin cuts so formed as to act as electric insulating gaps extending in a direction transverse to the direction of the eddy current voltages induced in the electrically-conducting magnetic material by A. C. fluxes induced in the core structure in a direction substantially perpendicular to the overlapping core sheet surfaces.

If desired, the channel portions of the members 3—43, 3—44 may be arranged so as not to overlap the exposed edges of the pole portions or the guide 3—71. This arrangement may be used with pole portions about as thick or slightly thicker than the wire.

The construction of Figs. 24 through 27 may advantageously be provided with a magnetic shield 90 so as to shield the magnetic core structure and winding against external stray fields. The shield may be in the form of two shell members surrounding the respective wall member and held in place by external mounting structure, such as screws. Each shield member 90 may be highly-permeable magnetic material, such as Mumetal, or, alternatively, each may be made of two internested shells, one of highly-conducting material, such as copper or silver, and the other of the highly-permeable material.

This invention is not restricted to constructions used with record tracks in the form of wire, and Figs. 28 and 29 illustrate another form of the invention used with a tape record track 131. The sub-assembly is shown of the same general type as that of Figs. 5 and 11, except that a plurality of sheet-metal pole pieces 51, arranged in a pile, is used as the magnetic core so as to occupy a width equal to the portion of the tape width desired to be used. The magnetic tapes are generally cut from rolls of large widths and the edges of the tape are deleteriously affected by the cutting. The tapes may be either metallic or in the form of a magnetic powder layer bonded onto a limp base, such as paper or plastic, or in the form of such a limp base containing the magnetic powder dispersed throughout its depth. A combined wall and guide member 443 is provided with an internal aperture 446 which receives the sub-assembly 166, and an external guide surface 440 along which the tape is led toward and away from the gap region of the magnetic core. The intermediate portion of the guide surface opens onto the internal aperture 446 and the pole pieces project through this perforation to a small distance above the floor to positively tension the tape and establish a substantially constant magnetic linkage between the tape and the pole face region of the core. This projecting distance is shown exaggerated in the drawings in the interest of clarity. A closure member 444 is shown fastened to the rear of member 443 to retain the sub-assembly in place.

The construction of Figs. 28 and 29 has the advantage that the magnetic sub-assembly may be inserted and removed by merely removing the rear wall member 444 and without disturbing the record track or guide. If desired, the construction of Figs. 5 and 20 may be similarly arranged for easier construction.

Two magnetic sub-assemblies may be mounted on a single head 35 shown in Fig. 1A, one being used for erasing and the other for transducing. With the magnetic record track in the form of a tape, the erasing core may be thicker than the transducing core so as to insure the magnetic netralization of a sufficient width of the tape when recording.

In Figs. 30 and 31 is shown another form of magnetic head of the invention, used with a magnetic record track in the form of tape. The magnetic head comprises a base plate 170 on which are mounted the two bobbin blocks 111, 112 on the opposite sides of the magnetic recording tape tracks 131. Two coil bobbins 181 of metal are slidably mounted in the cavities 182 of the two blocks so as to hold the pole pieces 105, 106 on the opposite sides of the tape 131. In order to keep the pole-piece receiving openings 117 of the bobbins 181 and 182 aligned perpendicularly to the direction of the motion of the tape 131, the outer ends of each bobbin are provided with one or more flat aligning members 186 fitting into longitudinal aligning apertures. A biasing spring 184, adjustably mounted on the exterior of each block, across the bobbin cavity, in a direction parallel to the tape 131, presses against shoulders 116 in the aligning members 186 and urges each bobbin toward each other, interposed auxiliary springs 107 acting to press the two pole pieces 105, 106 into engagement with the tape. In order to keep the bobbin 181 in its cavity, the bobbin screw 188 is mounted near the outer edge of the outer bobbin surface so that the screw head overlaps the adjacent edge of the bobbin block shown in Fig. 31.

The magnetic material of the pole pieces should have a minimum retentivity and high permeability. Such highly-permeable magnetic materials have a very low elastic limit and are very sensitive to strains imparted thereto by the moving tape. This strain is particularly great when a splice or a soldering joint in the tape passes across the pole piece and imparts thereto a shock. Even a temporary strain, within the limits of Hooke's law, imparted to a high-permeability pole piece, reduces its permeability which recovers slowly as the strain disappears. However, when subjected by a shock to a permanent deformation, beyond the limits of Hooke's law, the magnetic properties of such pole pieces are very materially impaired. Accordingly, any arrangement which reduces the strain imposed on the pole pieces by the moving tape, is of great value.

In accordance with the invention, these difficulties are overcome by uniting one or more thin magnetic sheet elements or laminae with one or more sheet elements of strong, non-magnetic, spring material, such as phosphor-bronze, which has relatively great elasticity, into an integral pole piece arranged so that the major part of strains or shocks imposed on such laminated pole piece is distributed and taken up by the highly-elastic non-magnetic laminae and thus reducing to a minimum the strain imposed on the magnetic material of the pole piece.

The highly-permeable magnetic and non-magnetic sheet laminae of such pole pieces may be united into a lamination either by a cement or by fusion with a fusing material which has a low fusing temperature so that the heat or fusion does not affect the permeability of the magnetic material. Instead of fusing, the pole-piece laminae may be united by rivets or held tightly within a support.

In Fig. 30 is shown one form of such laminated pole piece 105. A plurality of thin sheet elements or laminae 101, 102 of magnetic material is assembled between two outer laminae 103, 104 of non-magnetic, highly-elastic, spring material, such as phosphor bronze. In the form shown, the laminae are joined to each other by rivets 115.

The outer spring lamina 103 and the adjacent magnetic lamina 101 toward which the successive elements of the magnetic tape 131 move, have pole-tip portions projecting beyond the ends of the other laminae, so that only the thin pole-tip end surface of the projecting magnetic lamina 101 faces or engages the magnetic tape 131 passing thereunder and applies to its elements the magnetic force produced by the signal current. The pole tip of the outer spring lamina 103 is so positioned that each element of the moving tape reaches the pole tip of the spring lamina 103 before it reaches the pole tip of the magnetic lamina 101 lying behind it, so that the energy of the impact or shock imparted to the pole tip by a raised portion of the moving tape is taken up by the spring lamina 103 and is distributed thereby over a relatively large area of the magnetic pole piece 101 back of it, while assuring that, under normal operating conditions, the maximum strain imposed on the magnetic pole-tip lamina 101 will remain within its elastic limit.

The additional magnetic laminae 102 increase the magnetic cross-section of the central portion of the laminated pole piece which is traversed not only by the effective signal flux which enters from its magnetic pole tip into the tape, but also by the entire leakage flux and which should, therefore, have an area large enough to prevent its saturation when the maximum required signal flux is forced through the pole tip into a tape element.

In such pole pieces, the thickness of the magnetic pole-tip lamination 101 may be made much smaller than usual. Its thickness should be of the order of the thickness of the tape, or somewhat thicker, and may vary between one to five mils, depending on the thickness of the tape. The small thickness of the magnetic pole tip is made possible because it is backed up by the adjacent non-magnetic spring-metal lamina 103, which takes up the impact of the external forces, and because the adjacent shorter magnetic laminae provide in the central portion of its core, through which the pole-tip flux as well as the leakage flux has to pass, the cross-section required to prevent saturation of the pole piece during recording.

In the practical operation, such pole pieces having a width of 80 mils proved very satisfactory when used with a tape of the same order of width. For narrower tapes, the part of the pole tip extending below the rivet may be suitably narrowed to make it of the order of the width of the tape, or slightly narrower. Spring-metal laminae of a thickness of 10 to 20 mils are satisfactory. The rivet 115 should be placed at a distance from the pole tip, but not too far away therefrom, so as to assure that the free end of the spring backing element 103 has sufficient stiffness for taking up the strain imposed thereon by a raised portion of the passing tape without imposing any substantial strain on the magnetic pole piece in back of it. A rivet placed so that it is equally distant from the end and the sides of the pole piece, will be satisfactory. The shorter magnetic lamina 102 may be of greater thickness than the magnetic pole-tip lamina 101, for instance, of the order of five to ten mils. A needle-like rivet 115 of 20 mils thickness will be satisfactory. A pole-tip magnetic lamination 101 which projects about 10 to 20 mils beyond the adjacent magnetic lamina 102, will be satisfactory.

In magnetic recording arrangements using tapes which are driven in opposite directions, a laminated pole piece of the invention should be provided with a magnetic pole tip having spring-metal type laminae extending on both sides of the magnetic pole-tip lamina. Fig. 32 shows one form of such laminated pole-piece construction. It has a central pole-tip lamina 121 with a pole tip projecting beyond the ends of the adjacent magnetic laminae 122 which are held between two outer laminae 123 of spring metal.

The end portions of the spring-metal laminae 123 which face the pole-tip projection of the magnetic lamina 121, have an additional thickness 124 so as to abut and firmly hold both sides of the pole tip of the magnetic lamination 121. The additional thickness 124 may be provided either by fusing an additional spring-metal element to the sheet element forming the spring laminations 123, or by machining the long part of the spring lamination to a smaller thickness than its thicker end engaging the magnetic pole tip. The additional thickness 124 on the tips of the spring lamina 123 may be formed of a compressed sheet element of a cold-flowing material, such as Viscoloid, which is held tightly between the tip of the spring lamina 124 and the pole tip of the magnetic lamina 121 so as to form a solid backing therefor without subjecting it to strains that would impair its magnetic qualities. The several laminations are united, for instance, by rivets, as in Fig. 30.

Another form of pole-piece construction of the invention is shown in Figs. 33 and 34. The pole piece is made of a cylindrical rod 132 of highly-permeable magnetic material arranged to slidably fit into a cylindrical hole in the central core of the coil bobbin 181. The inner end of the pole piece 132 facing the tape 131 has flat surfaces tapering towards its center, in which is formed a flat groove extending in a direction transverse to the direction of the motion of the tape. Within the groove of the pole piece is firmly held a laminated pole-piece tip formed of a rectangular magnetic sheet element 133 held between two similar sheet elements 14—34 of spring metal.

The portion of the pole tip projecting beyond the edge of the groove is of the order of 10 mils, and the height or depth of the groove may be 30 mils, or slightly more. The dimensions of the groove in which the pole-tip elements are held, are so proportioned as to hold tightly the laminations of the pole tip without imposing any excessive strain on the magnetic lamination. A suitable cementitious material may be placed on the surfaces of the groove and the sheet elements of the pole-tip lamination before mounting so as to hold the pole tip firmly in its operating position, while preventing imposition of excessive strains on the magnetic pole tip.

In order to assure that the end of the magnetic pole-tip sheet element 133 is maintained at a 90° angle to the direction of the motion of the tape 131, the upper end of the pole piece is provided with an accurately-machined, central, flat key-portion 136 aligned 90° to its pole tip 133 and fitting into an accurately-cut longitudinal slit of the spring 184 which is accurately mounted on the top of its magnetic head block to hold the pole piece in its required position against the tape and to exert on the shoulder 137 of the pole piece the pressure required to keep the pole tip against the tape 131.

In accordance with the principles of the invention disclosed above in connection with Figs. 30 to 34, the efficiency of the magnetic transducer sub-assembly of the type described in connection with Figs. 4 to 29 is increased by filling the narrow, parallel gap space 54 or 354 and separating the opposing faces of the pole-piece portions 55 or 3—55 with a body of high electrical conductivity, such as a thin sheet of non-magnetic metal of high electrical conductivity. Such thin sheet may also serve as a spacer between the pole-piece faces and assist in the assembly and uniting of the two pole pieces 51 or 3—51 to a common rigid mounting member such as described. Such a non-magnetic insert will have eddy currents induced in it and will inhibit the penetration of magnetic flux except toward the magnetic recording track. In addition, such a body of electrically high, conducting material may also be placed in the space of the guide channel in the region alongside as well as opposite the magnetic gap on the exterior side of the recording track bridging the gap. A suitable retainer spring may be provided for yieldably urging the leakage suppressing element into the narrow guide slit 42—1, for example, and against the exterior side of the portion of record track engaging the pole faces. Care must be taken, however, to assure that the highly conducting members do not form a continuous ring around the pole gap and gap-bridging track element, since the eddy currents induced in such a transverse shorting ring would greatly lower the flux passing through inside the ring.

It has been found that a pole gap of about 15 microns or less produces excellent results, and that merely placing the two pole faces in contact after carefully finishing them off flat will provide the necessary gap. The usual film of oxides and adsorbed gases in the metal faces do not appear to permit much closer magnetic contact. However, the use of a spacer as described above, having a thickness of about 0.002 to 0.004 inch, will insure a proper gap spacing.

The unitary magnetic sub-assembly having projecting pole-gap regions as described in connection with Figs. 4 through 14 and 24 through 30, may be used without a surrounding wall or track guide means as, for example, with magnetic record tracks in the form of disks. The disk may be rotated on a turntable, the magnetic core sub-assembly being held on an arm similar to the tone-arm of a prior art phonograph, so that the projecting external pole faces bounding the gap contact the disk. Provision should be made to move the arm so that the pole faces have a spiral track along the magnetic disk. Such apparatus is more completely described and claimed in the Begun application Serial No. 612,-728, filed August 27, 1945, the disclosure of which is hereby made a part hereof. Either the single sheet-metal thickness magnetic core construction or the multiple thickness of Figs. 29 and 30 may be used. With a magnetic record disk in which the magnetic material is formed of a layer containing dispersed, permanently-magnetizable oxides, it has been found that the single-thickness magnetic core produces excellent results with a six-gram force holding the pole faces against the record track.

This application is in part a continuation of application Serial No. 550,573, filed August 22, 1944, now abandoned, and in part also a continuation of application Serial No. 340,030, filed June 12, 1940, now Patent 2,356,145, granted August 22, 1944.

The hum-bucking magnetic core construction is described and claimed in the Begun et al. application Serial No. 687,047, filed July 30, 1946.

The thin pole-piece construction is described and claimed in the Begun et al. application Serial No. 687,046, filed July 30, 1946, now U. S. Patent No. 2,493,742, granted January 10, 1950.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

I claim:

1. In a magnetic record transducing head for transducing magnetic records, such as recording or reproducing magnetic signals, by magnetic flux interlinkage with a relatively moving magnetic record track: a magnetic core structure constituting a substantially closed magnetic circuit including at least two separate core legs of flat sheet metal elements aligned with their planes generally parallel to the direction of the motion of the track relatively to the head; transducer windings surrounding leg portions of the magnetic core structure for carrying electric signals corresponding to the magnetic records; said core structure having exposed leg portions provided with flat parallel opposite sides projecting from said windings; said core structure having a non-magnetic gap and including two pole portions having exposed sheet metal pole-face edges aligned along one side of the record track and extending away from the opposite sides of said gap and adjacent to an elongated element of said record track, and non-magnetic mounting elements affixed to exposed leg portions and uniting all core legs of said core structure into an integral self-supporting and operative head unit maintaining all elements of said core structure and said windings in their operative relation; said pole portions having flat parallel sides projecting beyond the boundary of said mounting elements; and a guide structure of substantially rigid material having an outwardly opening guide channel for guiding said record track toward and away from engagement with said pole face edges past said gap; said guide structure having flat inwardly facing parallel wall surfaces interfitting with the opposite flat parallel sides of the exposed leg portions and said pole portions for detachably holding said head unit in its operative position within said guide structure.

2. In a magnetic record transducing head for transducing magnetic records by magnetic flux interlinkage with a relatively moving magnetic record track: a magnetic core structure constituting a substantially closed magnetic circuit including at least two separate core legs of flat sheet metal elements aligned with their planes generally parallel to the direction of the motion of the track relatively to the head; transducer windings surrounding leg portions of the magnetic core structure for carrying electric signals corresponding to the magnetic records; said core structure having exposed leg portions provided with flat parallel opposite sides projecting from said windings; said core structure having two flat pole portions held aligned across a non-magnetic gap for interlinking said windings with a track portion bridging said gap; a guide structure of non-magnetic substantially rigid material having an outwardly opening guide channel for guiding a recording track along aligned edge surfaces of said pole portions extending on one side of said record track; and substantially rigid non-magnetic mounting elements affixed to the opposite flat sides of said leg portions and uniting all core legs of said core structure into an integral self-supporting and operative head unit maintaining all elements of said core structure and said windings in their operative relation; said pole portions having flat parallel sides projecting beyond the boundary of said mounting elements; said guide structure having flat inwardly facing parallel wall surfaces interfitting with the opposite flat parallel sides of the exposed leg portions and said pole portions for detachably holding said head unit in its operative position within said guide structure.

3. In a magnetic record transducing head for transducing magnetic records by magnetic flux interlinkage with a relatively moving magnetic record track: a magnetic core structure constituting a substantially closed magnetic circuit including at least two separate core legs of flat sheet metal elements aligned with their planes generally parallel to the direction of the motion of the track relatively to the head; transducer windings surrounding leg portions of the magnetic core structure for carrying electric signals corresponding to the magnetic records; said core structure having exposed leg portions provided with flat parallel opposite sides projecting from said windings; said core structure having two flat pole portions held aligned across a non-magnetic gap for interlinking said windings with a track portion bridging said gap; a guide structure of non-magnetic substantially rigid material having an outwardly opening guide channel for guiding a recording track along aligned edge surfaces of said pole portions extending on one side of said record track; and a non-magnetic mounting member of metal united to exposed flat sides of said leg portions and joining all core legs of said core structure into an integral self-supporting and operative head unit maintaining all elements of said core structure and said windings in their operative relation; said pole portions having flat parallel sides projecting beyond the boundary of said mounting member; said guide structure having flat inwardly facing parallel wall surfaces interfitting with the opposite flat parallel sides of the exposed leg portions and said pole portions for detachably holding said head unit in its operative position within said guide structure.

4. In a sound recording and reproducing device, a base provided with a barrier of predetermined configuration, a core comprising a plurality of divided laminations stacked against and around said barrier in given relation thereto to provide a gap of predetermined dimension in said core, said barrier being shaped to engage substantial areas of the edge portions of said laminations whereby said laminations are positively located with respect to each other, a coil encircling said core and means for guiding a ferromagnetic recording medium along said core and across said gap.

5. In a magnetic record transducing head for transducing magnetic records by magnetic flux interlinkage with a relatively moving magnetic record track: a substantially closed magnetic core having only two confronting core legs defining between their leg ends a main non-magnetic gap and an auxiliary non-magnetic gap; transducing windings surrounding portions of said core legs; said core legs being formed of flat sheet metal elements aligned with their planes generally parallel to the direction of the motion of the track relatively to the head; said core legs having exposed leg portions projecting in opposite directions from said windings and provided with flat parallel opposite sides; mounting elements affixed to exposed leg portions and uniting said two core legs into an integral self-supporting head unit maintaining all elements of said core structure and said windings in their fixed operative relation; the leg ends bordering said main air gap projecting beyond the boundary of said mounting elements; and a guide structure of non-magnetic substantially rigid material having an outwardly opening guide channel for guiding a recording track along aligned edge surfaces of said leg portions bordering said main gap and extending substantially on one side of said record track; said guide structure having flat inwardly facing parallel wall surfaces interfitting with the opposite flat parallel sides of the exposed leg portions for detachably holding said head unit in its operative position within said guide structure.

6. In a magnetic record transducing head for transducing magnetic records by magnetic flux interlinkage with a relatively moving magnetic record track: a substantially closed magnetic core having only two confronting core legs defining between their leg ends a main non-magnetic gap and an auxiliary non-magnetic gap; transducing windings surrounding portions of said core legs; said core legs being formed of flat sheet metal elements aligned with their planes generally parallel to the direction of the motion of the track relatively to the head; said core legs having exposed leg portions projecting in opposite directions from said windings and being provided with flat parallel opposite sides; substantially rigid mounting elements affixed to exposed flat sides of said leg portions and uniting said two core legs into an integral self-supporting head unit maintaining all elements of said core structure and said windings in their fixed operative relation; the leg ends bordering said air gaps projecting beyond the boundary of said mounting elements; and a guide structure of non-magnetic substantially rigid material having an outwardly opening guide channel for guiding a recording track along aligned edge surfaces of said leg portions bordering said main gap and extending substantially on one side of said record track; said guide structure including two facing side walls having flat inwardly facing parallel wall surfaces interfitting with the opposite flat parallel sides of the exposed leg portions for detachably holding said head unit in its operative position within said guide structure.

7. In a magnetic record transducing head for transducing magnetic records by magnetic flux interlinkage with a relatively moving magnetic record track: a substantially closed magnetic core having only two confronting core legs defining therebetween a main non-magnetic gap and an auxiliary non-magnetic gap; transducing windings surrounding portions of said core legs; said core legs being formed of flat sheet metal elements aligned with their planes generally parallel to the direction of the motion of the track relatively to the head; said core legs having exposed leg portions projecting in opposite directions from said windings, and being provided with flat parallel opposite sides; a mounting member of metal united to exposed flat sides of said leg portions and joining said two core legs into an integral self-supporting head unit maintaining all elements of said core structure and said windings in their fixed operative relation; the leg ends bordering said main air gap projecting beyond the boundary of said mounting member; and a guide structure of non-magnetic substantially rigid material having an outwardly opening guide channel for guiding a recording track along aligned edge surfaces of said leg portions bordering said main gap and extending substantially on one side of said record track; said guide structure having flat inwardly facing parallel wall surfaces interfitting with the opposite flat parallel sides of the exposed leg portions for detachably holding said head unit in its operative position within said guide structure.

8. In a magnetic record transducing head for transducing magnetic records by magnetic flux interlinkage with a relatively moving magnetic record track: a magnetic core structure constituting a substantially closed magnetic circuit including at least two separate core legs of flat sheet metal elements aligned with their planes generally parallel to the direction of the motion of the track past the head; said two core legs being free from overlapping engagement with each other transducer windings surrounding leg portions of the magnetic core structure for carrying electric signals corresponding to the magnetic records; said core structure having exposed leg portions provided with flat parallel opposite sides projecting from said windings; said core structure having two flat pole portions held aligned across a non-magnetic gap for interlinking said windings with a track portion bridging said gap; and non-magnetic mounting elements engaging exposed leg portions and uniting all core legs of said core structure into an integral self-supporting and operative head unit maintaining all elements of said core structure and said windings in their operative relation; said pole portions having flat parallel sides projecting beyond the boundary of said mounting elements.

9. In a magnetic record transducing head for transducing magnetic records by magnetic flux interlinkage with a relatively moving magnetic record track: a magnetic core structure constituting a substantially closed magnetic circuit including at least two separate core legs of flat sheet metal elements aligned with their planes generally parallel to the direction of the motion of the track past the head; said two core legs being free from overlapping engagement with each other transducer windings surrounding leg portions of the magnetic core structure for carrying electric signals corresponding to the magnetic records; said core structure having exposed leg portions provided with flat parallel opposite sides projecting from said windings; said core structure having two flat pole portions held aligned across a non-magnetic gap for interlinking said windings with a track portion bridging said gap; and non-magnetic substantially rigid mounting members affixed to the opposite flat sides of said exposed leg portions and uniting all core legs of said core structure into an integral self-supporting and operative head unit maintaining all elements of said core structure and said windings in their operative relation; said pole portions having flat parallel sides projecting beyond the boundary of said mounting members.

10. In a magnetic record transducing head for transducing magnetic records by magnetic flux interlinkage with a relatively moving magnetic record track: a magnetic core structure constituting a substantially closed magnetic circuit including at least two separate core legs of flat sheet metal elements aligned with their planes generally parallel to the direction of the motion of the track past the head; said two core legs being free from overlapping engagement with each other transducer windings surrounding leg portions of the magnetic core structure for carrying electric signals corresponding to the magnetic records; said core structure having exposed leg portions provided with flat parallel opposite sides projecting from said windings; said core structure having two flat pole portions held aligned across a non-magnetic gap for interlinking said windings with a track portion bridging said gap; a non-magnetic mounting member of metal united to exposed flat sides of said leg portions and joining all core legs of said core structure into an integral self-supporting and operative head unit maintaining all elements of said core structure and said windings in their operative relation; said pole portions having flat parallel sides projecting beyond the boundary of said mounting member.

11. In a magnetic record transducing head for transducing magnetic records by magnetic flux interlinkage with a relatively moving magnetic record track: a substantially closed magnetic core having only two confronting core legs defining between their leg ends a main non-magnetic gap and an auxiliary non-magnetic gap; transducing windings surrounding portions of said core legs; said core legs being formed of flat sheet metal elements aligned with their planes generally parallel to the direction of the motion of the track past the head; said two core legs being free from overlapping engagement with each other said core legs having exposed leg portions projecting in opposite directions from said windings and being provided with flat parallel opposite sides; and mounting elements affixed to exposed leg portions and uniting said two core legs into an integral self-supporting head unit maintaining all elements of said core structure and said windings in their fixed operative relation; the leg ends bordering said main air gap projecting beyond the boundary of said mounting elements.

12. In a magnetic record transducing head for transducing magnetic records by magnetic flux interlinkage with a relatively moving magnetic record track: a substantially closed magnetic core having only two confronting core legs defining between their leg ends a main non-magnetic gap and an auxiliary non-magnetic gap; transducing windings surrounding portions of said core legs; said core legs being formed of flat sheet metal elements aligned with their planes generally parallel to the direction of the motion of the track past the head; said two core legs being free from overlapping engagement with each other said core legs having exposed leg portions projecting in opposite directions from said windings and being provided with flat parallel opposite sides; substantially rigid mounting elements affixed to exposed flat sides of said leg portions and uniting said two core legs into an integral self-supporting head unit maintaining all elements of said core structure and said windings in their fixed operative relation; the leg ends bordering said main air gap projecting beyond the boundary of said mounting elements.

13. In a magnetic record transducing head for transducing magnetic records by magnetic flux interlinkage with a relatively moving magnetic record track: a substantially closed magnetic core having only two confronting core legs defining between their leg ends a main non-magnetic gap and an auxiliary non-magnetic gap; transducing windings surrounding portions of said core legs; said core legs being formed of flat sheet metal elements aligned with their planes generally parallel to the direction of the motion of the track past the head; said two core legs being free from overlapping engagement with each other said core legs having exposed leg portions projecting in opposite directions from said windings, and being provided with flat parallel opposite sides; and a mounting member of metal united to exposed flat sides of said leg portions and joining said two core legs into an integral self-supporting head unit maintaining all elements of said core structure and said windings in their fixed operative relation; the leg ends bordering said main air gap projecting beyond the boundary of said mounting member.

SEMI JOSEPH BEGUN.

REFERENCES CITED

The following references are of record in the file of this patent:

UNITED STATES PATENTS

| Number | Name | Date |
|---|---|---|
| 1,867,179 | Schroeter | July 12, 1932 |
| 2,277,305 | Clopton | Mar. 24, 1942 |
| 2,351,003 | Camras | June 13, 1944 |
| 2,351,007 | Camras | June 13, 1944 |